(12) United States Patent
Mycek et al.

(10) Patent No.: US 9,622,208 B2
(45) Date of Patent: Apr. 11, 2017

(54) SYSTEMS AND METHODS FOR OBJECT TRACKING WITH WIRELESS BEACONS

(71) Applicant: Estimote, Inc., New York, NY (US)

(72) Inventors: Marcin Mycek, Kraków (PL); Michal Sznajder, Kraków (PL); Grzegorz Krukiewicz-Gacek, Kraków (PL); Lukasz Kostka, Walnut, CA (US); Jakub Krzych, Walnut, CA (US)

(73) Assignee: Estimote, Inc., New York, NY (US)

( * ) Notice: Subject to any disclaimer, the term of this patent is extended or adjusted under 35 U.S.C. 154(b) by 0 days.

(21) Appl. No.: 15/253,376

(22) Filed: Aug. 31, 2016

(65) Prior Publication Data

US 2017/0064667 A1 Mar. 2, 2017

Related U.S. Application Data

(60) Provisional application No. 62/213,467, filed on Sep. 2, 2015.

(51) Int. Cl.
*H04W 24/00* (2009.01)
*H04W 64/00* (2009.01)
*G01S 5/02* (2010.01)

(52) U.S. Cl.
CPC .......... *H04W 64/00* (2013.01); *G01S 5/0294* (2013.01)

(58) Field of Classification Search
CPC ........ G01S 5/0263; G01S 5/0289; G01S 5/14; G01S 13/825; G01S 13/79; G01S 13/765; G01S 5/0294; G01S 5/0252; G06F 3/017; H04W 4/02; H04W 64/00; H04W 64/006; H04W 64/003; H04W 24/00; G06K 17/0022

USPC .............. 455/456.1, 41.2; 340/539.13, 572.1
See application file for complete search history.

(56) References Cited

U.S. PATENT DOCUMENTS

| | | | |
|---|---|---|---|
| 7,027,808 B2 * | 4/2006 | Wesby | G06Q 40/00 340/853.1 |
| 7,038,584 B2 * | 5/2006 | Carter | G01S 5/0036 340/539.13 |
| 7,072,671 B2 | 7/2006 | Leitch | |
| 7,639,131 B2 * | 12/2009 | Mock | G01S 5/0205 340/539.11 |
| 7,705,728 B2 * | 4/2010 | Mock | G01S 5/0294 340/539.13 |
| 8,058,988 B1 * | 11/2011 | Medina, III | G08B 21/0238 340/539.1 |
| 8,644,255 B1 | 2/2014 | Burcham et al. | |
| 8,694,782 B2 | 4/2014 | Lambert | |
| 8,847,754 B2 * | 9/2014 | Buchheim | G01S 1/68 340/539.13 |
| 9,036,792 B2 * | 5/2015 | Cacioppo | H04W 4/02 379/45 |
| 2002/0167919 A1 | 11/2002 | Marples et al. | |
| 2003/0100315 A1 | 5/2003 | Rankin | |
| 2006/0163349 A1 | 7/2006 | Neugebauer | |
| 2006/0290519 A1 * | 12/2006 | Boate | G07C 9/00111 340/573.4 |
| 2009/0327135 A1 | 12/2009 | Nguyen et al. | |
| 2010/0093374 A1 | 4/2010 | DaCosta | |

(Continued)

*Primary Examiner* — Mahendra Patel
(74) *Attorney, Agent, or Firm* — Jeffrey Schox; Diana Lin

(57) ABSTRACT

An object tracking system can include beacons and tracking module. The object tracking method can include determining the location of a mobile device and determining the location of an object beacon.

20 Claims, 13 Drawing Sheets

(56) References Cited

U.S. PATENT DOCUMENTS

| | | |
|---|---|---|
| 2011/0305228 A1 | 12/2011 | Cordeiro |
| 2012/0095805 A1 | 4/2012 | Ghosh et al. |
| 2012/0172055 A1* | 7/2012 | Edge .................... G01S 5/0018 455/456.1 |
| 2012/0190386 A1 | 7/2012 | Anderson |
| 2012/0316960 A1 | 12/2012 | Yang |
| 2013/0023282 A1* | 1/2013 | Lin ....................... G01S 5/0252 455/456.1 |
| 2013/0063303 A1* | 3/2013 | Zhou ...................... G01S 19/48 342/357.29 |
| 2013/0182625 A1 | 7/2013 | Kuehnel et al. |
| 2013/0184002 A1* | 7/2013 | Moshfeghi ............ G01S 5/0263 455/456.1 |
| 2013/0203445 A1 | 8/2013 | Grainger et al. |
| 2013/0337771 A1 | 12/2013 | Klein et al. |
| 2014/0087758 A1* | 3/2014 | Maor .................... G01S 5/0252 455/456.1 |
| 2015/0005011 A1* | 1/2015 | Nehrenz ................ H04W 4/02 455/456.3 |
| 2015/0031388 A1 | 1/2015 | Chatterjee et al. |
| 2015/0296333 A1* | 10/2015 | Chen ...................... H04W 4/02 455/456.1 |
| 2016/0086460 A1* | 3/2016 | King ................ G08B 13/19695 340/572.1 |

\* cited by examiner

SYSTEMS AND METHODS FOR OBJECT TRACKING WITH WIRELESS BEACONS

CROSS-REFERENCE TO RELATED APPLICATIONS

This application claims the benefit of U.S. Provisional Application No. 62/213,467 filed 2 Sep. 2015, which is incorporated in its entirety by this reference.

TECHNICAL FIELD

This invention relates generally to the wireless communications field, and more specifically to new and useful systems and methods for object tracking with wireless beacons in the wireless communications field.

BACKGROUND

Being able to identify and track objects as they move throughout buildings or other indoor areas with high precision is important for a wide variety of applications. Systems designed to track objects in this way, often called real-time locating systems (RTLS), find use in manufacturing, warehousing, retail inventory management, and medicine, to name a few areas.

Unfortunately, current methods of object locating used by RTLS are frequently associated with cost and/or usability issues.

Tracking low-power beacons within a physical space can be particularly challenging because the signals transmitted by low-power beacons may not travel long distances (e.g., due to the low-power nature of the signal transmission), and can be transmitted intermittently (e.g., to minimize power consumption). This limited distance and intermittent transmission can preclude object tracking using a central hub, router, or tracking center, especially in large physical spaces. Including more hubs within the physical space can be cost-prohibitive.

Furthermore, the objects (to which the low-power beacons are attached) can be mobile. This can further compound the problems discussed above, as the locations of the low-power beacons must be continually monitored. Because these hubs require a large amount of power to constantly scan for, receive, and decode the beacon signals, the hubs require significant amounts of power. This power requirement means that the hubs must be connected to a constant power source, such as the power grid. However, this would require power cords to be run through the physical space—either over the interior surfaces (e.g., over the floors and walls), which can be undesirable from an aesthetic and safety perspective, or underneath the interior surfaces (e.g., through the floors and walls), which is difficult and costly to install and change.

Additionally, the low-power beacon location determined by these hub systems can be inaccurate, particularly when the hub includes an omnidirectional antenna. This is because the hub can determine that the low-power beacon is located within an estimated distance from the hub (e.g., based on RSSI values), but cannot determine the direction in which the low-power beacon is located. An extremely high density of hubs would be required to obtain a higher-resolution estimate of the low-power beacon location; however, this high hub density merely amplifies the cost and power issues discussed above.

Thus, there is the need in the wireless communications field to create systems and methods for object tracking with wireless beacons in the wireless communications field. This invention provides such new and useful systems and methods.

DESCRIPTION OF THE PREFERRED EMBODIMENTS

Figure 1:
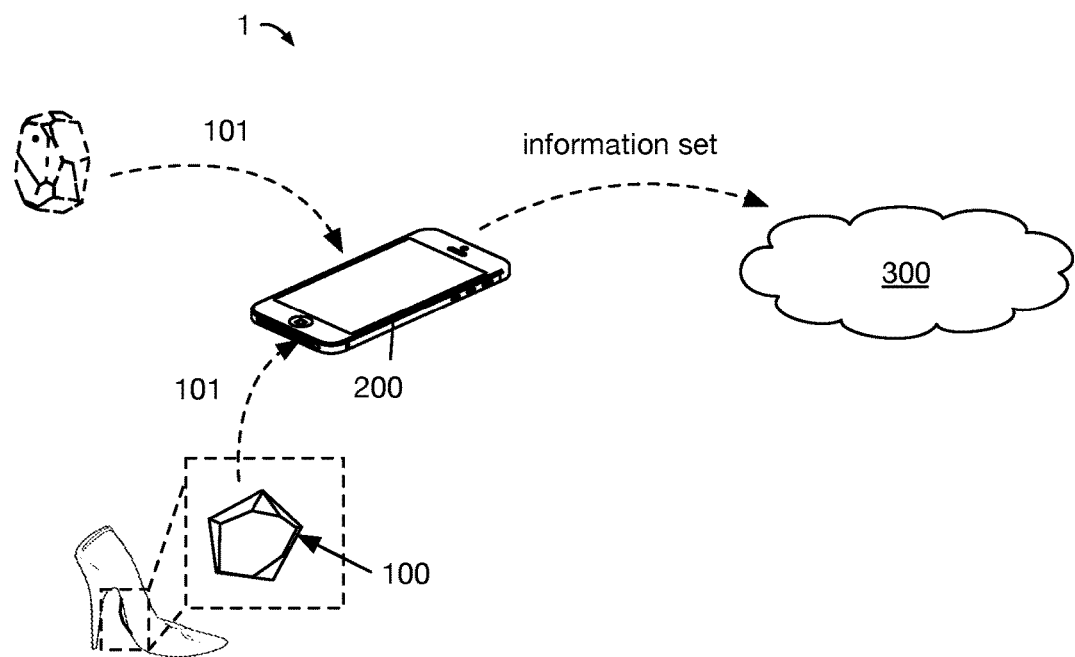
FIG. 1 is a schematic representation of the object tracking system.

The following description of the preferred embodiments of the invention is not intended to limit the invention to these preferred embodiments, but rather to enable any person skilled in the art to make and use this invention.

1. Overview

The systems and methods described herein function to track objects coupled to object beacons within a space. In some variants, these systems and methods can track the locations of the low-power beacons within a physical space by bootstrapping (e.g., crowdsourcing) beacon monitoring across one or more user devices moving within the physical space. The multiple beacon signal measurements, coupled with the multiple user device locations at which the beacon signals were received, can be used to determine the low-power beacon location within the space with relatively high resolution.

The systems and methods can be used in multiple applications. In a first application, the systems and methods can be used to track retail assets or inventory (e.g., products for sale) in a retail context. The systems and methods can additionally be used to present information for the retail object (e.g., descriptions, etc.) to a user on their user device, to infer user engagement or interest for the retail object (e.g., based on how long the user device receives beacon packets from the respective object beacon), or be used in any other suitable manner. In a second application, the systems and methods can be used to track objects within a domestic context (e.g., home, classroom, etc.). For example, the object beacons can be attached to and used to track the location of keys, toys, pets, children, or other mobile objects. In a third application, the systems and methods can be used to track objects within a medical context (e.g., during surgery, medication dispensation, etc.). For example, medical supplies (e.g., gauze, scissors, etc.), medication, or other medical objects can be tracked and automatically inventoried. In a fourth application, the systems and methods can be used to track objects within a manufacturing context, where object beacons can be used to track and/or monitor tools, fixtures, machines, or other objects. In a fifth application, the systems and methods can be used to track files or other physical objects within an office context. However, the systems and methods can be used in any other suitable application.

2. Benefits

The systems and methods described herein can confer several benefits over conventional systems.

The systems and methods can improve remote object location and provide a low-cost, low-resource-intensive object and/or beacon management system in several ways.

First, the systems and methods can improve remote object location by eliminating and/or reducing the need for the space entity to purchase and install static hubs by leveraging the user devices of users within the space, such as customer devices (e.g., in a retail application) or family member devices (e.g., in a home application). In particular, the systems and methods leverage the fact that the user devices are mobile and will likely move within the space (e.g., by the user, as the user traverses within the space). As the user device moves within the space, the user device can receive beacon signals broadcast by the low-power beacons. The system and method can then use information determined from the beacon signal (e.g., beacon signal strength, beacon data, etc.) and the user device's location at the time of beacon signal receipt to estimate the low-power beacon's location; the more beacon signal information-user device location pairs there are for a given low-power beacon, the more accurate the location estimate becomes.

Second, the systems and methods can improve remote object location by enabling relatively high-resolution and/or accuracy remote beacon location monitoring. In particular, some variants of the system and method include a remote computing system, wherein the remote computing system can determine, aggregate, and/or store information for each beacon and/or user device. Not only does this offer a centralized repository for beacon information and management, but it also allows the beacon location determination to be crowdsourced across multiple user devices. For example, the low-power beacon location can be determined from signal information and user device locations received from a first and second user device and/or user client, wherein the first and second user devices are associated with entirely different users.

The systems and methods can also improve beacon operation.

First, the systems and methods can improve beacon operation by reducing beacon power consumption because the systems and methods reduce or eliminate the need for the beacons to operate in the master mode (e.g., high-power mode) to monitor the other beacons around it. This can function to prolong beacon lifetime and operation.

Second, the systems and methods can improve beacon operation by continuously collecting and utilizing datasets unique to internet-enabled mobile computing devices (e.g., beacon signal information, variable user device locations, etc.) in order to provide remote beacon location support.

The systems and methods can also improve user device location determination.

First, the systems and methods can determine the location of a user device with less noise and/or variability than conventional location systems (e.g., GPS systems). In some variants, this can be accomplished by trilaterating the user device location based on beacon signals received from a set of fixed venue beacons.

Second, the systems and methods can remotely determine user device dwell time within a physical region, which can be used to infer user interests, locate lost phones, or confer any other suitable benefit.

The systems and methods can also provide technical solutions necessarily rooted in computer technology (e.g., utilizing beacon signal information determined by user devices receiving the beacon signals to determine a physical beacon location, etc.) to overcome issues specifically arising with computer technology (e.g., beacon power constraints, signal power and transmission distance constraints, location system noise, etc.). The systems and methods can also effect a transformation of a particular article (e.g., beacon signals) into a different state or thing (e.g., beacon location, beacon information, beacon operation, virtual maps, etc.). However, the systems and methods can confer any other benefit.

3. Object Tracking System

As shown in FIG. 1, the object tracking system 1 includes beacons 100 and tracking module 300. The system 1 functions to enable the tracking of objects coupled to beacons.

Figure 9:
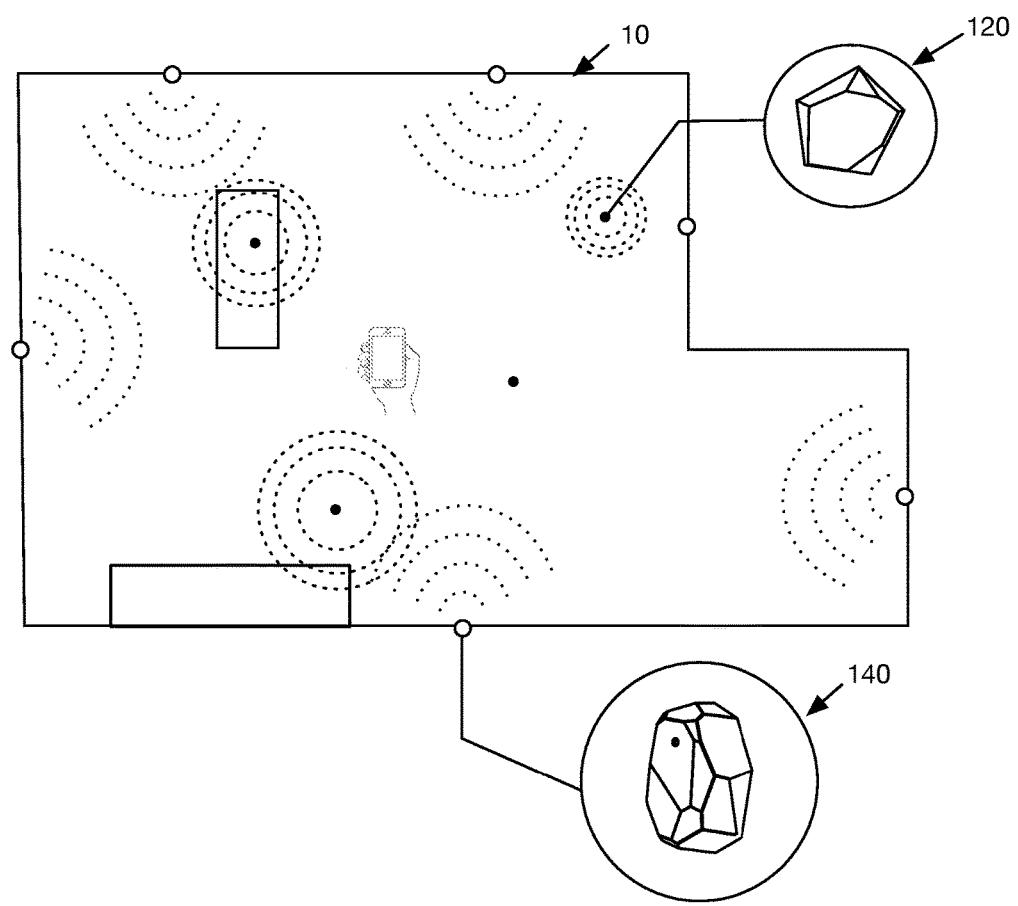
FIG. 9 is a schematic representation of an example of the beacons distributed within a physical space.

The beacons 100 of the system function to identify a context, object, location, or other information. The beacons can include object beacons 120, venue beacons 140, or any other suitable beacon. The beacons are preferably arranged (e.g., distributed) within a physical space, wherein users with user devices (mobile devices) can wander throughout the physical space (example shown in FIG. 9).

Figure 2:
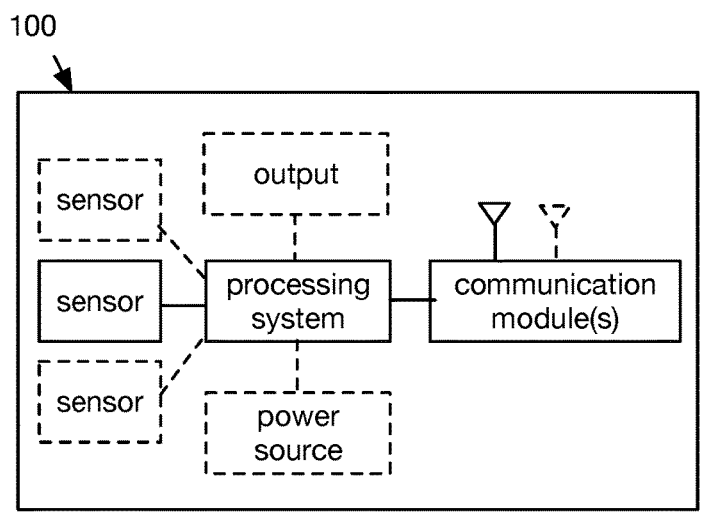
FIG. 2 is a schematic representation of a variant of a beacon of the object tracking system.
Figure 3:
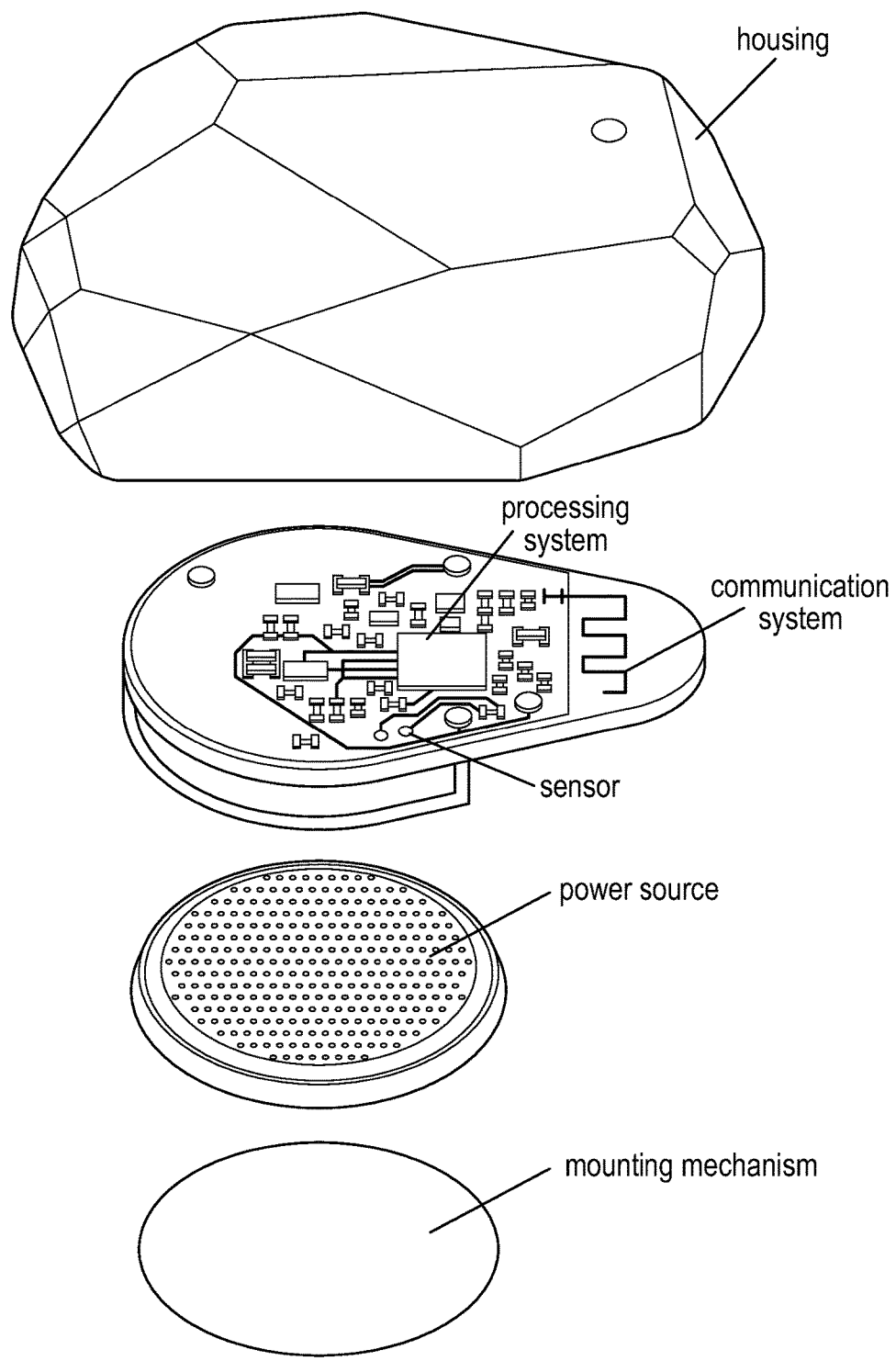
FIG. 3 is an exploded view of a specific example of a beacon of the object tracking system.

As shown in FIG. 2, the beacons 100 can each include: a water- and/or dust-resistant cover housing a battery, a wireless communication module, a processing system, a set of sensors, and a mounting mechanism (example shown in FIG. 3). However, the beacons 100 can additionally or alternatively include any other suitable component. The battery can be a primary battery (e.g., a watch battery, etc.), a secondary battery (e.g., a rechargeable battery, a lithium ion battery, etc.), an energy harvesting system, or be any other suitable power storage system. The wireless communication module can support one or more communication protocols, and include one or more radios (e.g., antenna and transceiver set) for each communication protocol. The antennas can be omnidirectional, multidirectional, unidirectional, or have any other suitable directionality. Examples of communication protocols that can be used include: 802.11x, Wi-Fi, Wi-Max, WLAN, NFC, RFID, Bluetooth, Bluetooth Low Energy, BLE long range, ZigBee, cellular telecommunications (e.g., 2G, 3G, 4G, LTE, etc.), radio (RF), microwave, IR, audio, optical, wired connection (e.g., USB), or any other suitable communication module or combination thereof. The processing system can be a CPU, GPU, microprocessor, organic computer, plastic processor, microprocessor, or be any other suitable processing system. The processing system can be electrically and/or communicatively connected to some or all of the active beacon components, and can receive information from, process information for, and/or control operation of the connected beacon components. The sensor set functions to monitor ambient environment and/or beacon operation parameters, and can include one or more: accelerometers, gyroscopes, temperature sensors, ambient light sensors, magnetometers, clocks, microphones, or any other suitable sensor. The mounting mechanism functions to mount the beacon to an object or other mounting surface, and can include adhesive material, screws, clips, magnets, or any other suitable mounting mechanism. In a specific example, the beacon can be a sticker, wherein the beacons are adhered to objects for which location tracking (or other sensed information; e.g., temperature) is desired. The beacons can optionally include inputs which function to receive external information (e.g., through tapping the beacon, flipping the beacon, etc.). The inputs can be one or more sensors of the sensor set or communication module of communication module set, or be any other suitable input. The beacons can optionally include outputs which function to present information, and which can include speakers, lights, displays, vibration motors, or any other suitable output. The beacons can optionally include location systems, such as GPS systems, cellular triangulation systems, trilateration systems, or other location systems. However, the beacons can include any other suitable component.

The beacons 100 preferably transmit beacon signals 101 (e.g., beacon packets), which function to communicate beacon information. In one variation, each beacon can concurrently broadcast only a single beacon packet, containing the beacon information. In a second variation, each beacon can concurrently broadcast multiple beacon packets. Beacon signal transmission can be targeted (e.g., addressed to a specific endpoint), broadcast, or otherwise sent. The beacon signals can be radio, ultrasonic, optical, laser, or be any other suitable type of signal. The beacon signal can use an iBeacon protocol, Eddystone protocol, Estimote's Nearable protocol, BLE protocol, Bluetooth protocol, Bluetooth long distance protocol, or any other suitable protocol (including custom protocols) to communicate information. The beacon signals can be transmitted at a predetermined frequency (e.g., user-determined; automatically determined; automatically determined to optimize for energy efficiency and signal stability; scheduled; variable based on operation parameters, such as time of day, ambient light, movement, etc.; otherwise determined), using a predetermined broadcasting power (e.g., user-determined; automatically determined; scheduled; variable based on operation parameters, such as time of day, ambient light, movement, etc.; otherwise determined), but can be transmitted using any other suitable set of transmission parameters. The beacon information is preferably encoded in the beacon signal (e.g., through signal modulation, etc.), but can be otherwise communicated through the beacon signal.

Beacon information is preferably stored by a beacon database, but can alternatively be otherwise managed. The beacon database can be stored by the remote computing system, the user device (e.g., user client), or by any other suitable storage system. Beacon information can include beacon data (e.g., identifiers, operation data, etc.), beacon locations, associated objects, information for the associated objects, associated entities (beacon entities), associated user devices (e.g., identifiers for user devices that received the beacon signals), beacon signal information (e.g., broadcast power), or other beacon information.

The beacon data can include a beacon identifier, sensor data, derivatory data (e.g., derived from the sensor data or auxiliary data, such as motion initiation time, motion termination time, etc.), operation data (e.g., SOC, broadcasting power), software data (e.g., firmware version), or any other suitable data. In one example, the beacon data includes a beacon context classifier (e.g., fridge, dog, computer etc.), beacon identifier (broadcast identifier, unique beacon identifier), beacon orientation in space, beacon motion in X, Y, Z axes, ambient temperature, broadcasting power, battery level, and firmware version.

The beacons 100 are preferably each associated with a beacon identifier. The beacon identifier can be globally unique, locally unique, or otherwise distinguished. In one variation, the beacon can be associated with a broadcast identifier and a unique identifier, wherein the broadcast identifier is locally unique (e.g., to the set of proximal beacons, to the physical space, etc.) and the unique identifier is globally unique. The broadcast identifier can be generated from the respective unique identifier, assigned (e.g., randomly assigned), or otherwise associated with the beacon. The unique identifier is preferably assigned by the beacon manufacturer, but can be otherwise associated with the beacon. In one variation, the beacon can locally generate the broadcast identifier based on the unique identifier and a set of rules, wherein the unique identifier can be determined by the remote computing system or user device from the broadcast identifier based on the set of rules. In a second variation, the unique identifier is determined using the broadcast identifier and a lookup table. However, the broadcast identifier can be otherwise resolved into the unique identifier.

Beacon sensor data can be sensor data recorded by the beacon from sensors on-board the beacon, recorded by auxiliary systems, or be any other suitable sensor data. The sensor data can be recorded periodically, upon occurrence of a trigger event (e.g., beacon motion), or at any other suitable time. The sensor sampling rates can be constant, change as a function of ambient environment parameter (e.g., increase with increased motion), change as a function of operation parameters (e.g., decrease with lowered SOC), or be determined in any other suitable manner. Each set of beacon sensor data can be associated with a recordation time, or associated with any other suitable data. In one variation, the beacon database can receive and generate a time series of sensor data for each beacon, wherein the time series includes sensor data recorded by and received from said beacon. In a second variation, the beacon database can cache a predetermined amount of sensor data (e.g., the last two sets of sensor data, sensor data timestamped with a time within the last hour, etc.), cache the sensor data for a predetermined amount of time (e.g., for 2 hours), or store any suitable set of sensor data for each beacon.

Beacon locations can include physical beacon location identifiers (e.g., GPS coordinates, Cartesian coordinates, venue names, etc.), location estimates (e.g., a location identifier with an uncertainty estimate, probability, or distance, etc.), region estimates (e.g., centered about the location identifier, geofence based on the physical space layout, etc.), distance estimates (e.g., distances from a reference point, such as a mobile device location or venue beacon location), virtual locations (e.g., within a virtual map of a physical region), and/or be any other suitable beacon location. The beacon locations can be received from a user device (e.g., automatically determined during setup, manually entered by a user, etc.), automatically estimated (e.g., using the methods discussed below, triangulated, etc.), received from the beacon, or otherwise determined. In one variation, the beacon location is determined based on a reference location, wherein the reference location can be the location of a secondary beacon, the location of a user device proximal the beacon (e.g., close enough to receive the beacon packets), or be any other suitable reference location. In one example, the beacon location is trilaterated from the user device location and the signal quality value of the signal received by the user device from the beacon. In a second variation, the venue beacon location is received from a user (e.g., from the location system of a user device, from a virtual map, etc.). In a third variation, the object beacon location is automatically determined based on the relative position of the object beacon relative to a set of mobile devices, wherein the locations of the mobile devices can be automatically determined from venue beacon locations or otherwise determined.

However, the beacon data can include any other suitable data determined in any other suitable manner.

Signal information is preferably descriptive of the signal transmitted by a given beacon and/or received by a mobile device, and can include beacon signal quality measures, signal phase (e.g., at receipt, transmission, etc.), amplitude, receipt time, transmission time (e.g., extracted from the beacon information), or any other suitable information. Examples of beacon signal quality measures include received signal strength indication (RSSI), bit error rate (BER), Phase of Arrival (POA), Time of Arrival (TOA), Frequency of Arrival (FOA), or any other suitable characterization of the beacon signal quality. Beacon information for each beacon can be stored for one or more timepoints and/or receiving devices by the beacon database, or otherwise stored.

In a first variation, the beacons can include object beacons 120 that function to identify the mobile objects to which they are attached (e.g., mounted to, coupled to, etc.). In particular, the object beacons function to provide signals (e.g., low-power signals, object beacon signals, etc.) to the tracking module that may be used to track the proximity of objects relative to the mobile device operating the tracking module. From multiple measurements of proximity of the object beacons (and known positions of the mobile device at the time those measurements were made), the position of objects tagged with object beacons can be tracked. The object beacon location within the beacon database can be constantly re-determined, based on updated data; however, the object beacon location can be otherwise determined.

In some variations, the object beacons 120 can include a water- and/or dust-resistant cover housing a battery, a wireless communication module, a microcontroller, one or more sensors (e.g., an accelerometer, a gyroscope, a temperature sensor, etc.), and an adhesive backing. However, the object beacons can be otherwise configured. The object beacons are preferably configured to couple to a mobile object, but can be configured to couple to any other suitable mounting point. The object beacons can be preferably substantially smaller than the venue beacons, and can also have a lower-capacity battery. The object beacons can function as low-power beacons, wherein the object beacons, to conserve battery life, can include fewer or different sensors than the venue beacons, can have reduced range compared to the venue beacons, can advertise less frequently than the venue beacons, and can operate exclusively or mostly in slave mode. However, the object beacons can be otherwise operated to conserve battery power. The object beacon's wireless communication module preferably shares one or more protocols with the venue beacon and/or mobile device, but can alternatively share no protocols with the venue beacon and/or mobile device. The object beacons preferably broadcast object beacon data (e.g., a beacon identifier) using a Bluetooth Low Energy (BLE) radio operating at 2.4 GHz, but can additionally or alternatively broadcast data using any transmission means. In a specific example, the object beacons can broadcast a Bluetooth Smart signal up to approximately 7 meters. In a second specific example, the venue beacons include a 100 or 200 mAh battery. However, the object beacons can be otherwise configured.

In a second variation, the beacons can include venue beacons 140 that function to identify a substantially fixed (e.g., mounted to, coupled to, etc.) a physical location within a physical space (e.g., the venue surfaces, such as walls, floors, etc.). In particular, the venue beacons function to provide signals (e.g., high-power signals, venue beacon signals, etc.) to the tracking module that may be used to track the location of mobile devices relative to the venue beacons. The venue beacons preferably correspond to locations within a particular venue (e.g., a room, an office, a house, a stadium, etc.) such that the location of mobile devices relative to the venue beacons can be translated into a location relative to the venue. Additionally or alternatively, the venue beacons may themselves define a venue (e.g., an invisibly fenced outdoor area). The venue beacon is preferably associated with a fixed location within the beacon database, but can be otherwise determined at any suitable frequency.

In one example, the venue beacons 140 can be placed (i.e., statically arranged) within a retail setting (i.e., retailer) such that, when a user enters the retailer with his mobile device executing a native retail application, the mobile device and the beacon can interact to deliver micro-location-, product-, and/or user-specific data, deals, notifications, or other information to the user (e.g., via the user device). In another example, multiple venue beacons can be placed over various regions of the window of a display case within a bakery such that, when a user enters the bakery with his mobile computing device, the mobile device and various beacons cooperate to determine the user's position within the bakery and deliver product-related information to the user through the mobile device based on the estimated proximity of the user to a particular foodstuff within the display case.

The venue beacons 140 can include a water- and/or dust-resistant cover housing a battery, a wireless communication module, a microcontroller, one or more sensors (e.g., an accelerometer, a gyroscope, a temperature sensor, etc.), and an adhesive backing. However, the object beacons can be otherwise configured. The venue beacons can be larger than the object beacons (e.g., 1.5 times the volume, 2 times the volume, etc.), and can include higher-capacity batteries, higher-powered processors, or components having any other suitable specification, as compared to the object beacons. The venue beacons can be high-power beacons, wherein each venue beacon's broadcast frequency, broadcast power, or other operation parameter can be higher than that of the object beacons. However, the venue beacon operation parameter values can be equal to or less than that of the object beacons. The venue beacons can operate mainly in the slave mode, selectively operate in the master mode, or operate in any other suitable mode at any other suitable time. The venue beacons preferably broadcast venue beacon data (e.g., a beacon identifier) using a Bluetooth Low Energy (BLE) radio operating at 2.4 GHz, but may additionally or alternatively broadcast data using any transmission means. In a specific example, the venue beacons can broadcast a Bluetooth signal up to 70 meters. In a second specific example, the venue beacons include a 1000 mAh battery. However, the venue beacons can be otherwise configured.

However, the beacons 100 can include any other suitable type of beacon configured in any other suitable manner.

The tracking system 300 of the system 1 functions to receive beacon information and determine the location of a system component based on the beacon information and a reference location. The tracking system 300 can enable object beacon tracking by measuring both the position of the mobile device operating the tracking module and the proximity of object beacons to that device. For example, the tracking module determines an object beacon location, wherein the tracking module receives an object beacon signal quality value from a user device, determines a distance estimate between the object beacon and the user device based on the object beacon signal quality value, and determines an object beacon location based on the distance estimate and the user device location (e.g., through trilateration).

The tracking system 300 (tracking module) can optionally determine the position of the mobile device by trilateration using signals from the venue beacons; additionally or alternatively, the tracking system 300 may determine location of the mobile device in any manner. For example, the tracking system 300 determines a user device location, wherein the tracking module receives a venue beacon signal quality value from a user device, determines a distance estimate between the venue beacon and the user device based on the venue beacon signal quality value, and determines a user device location based on the distance estimate and the known venue beacon locations (e.g., retrieved from the beacon database). In a second example, the tracking system 300 receives the user device location, determined by the user device, from the user device (e.g., GPS coordinates). However, the tracking system 300 can determine the physical location of any other suitable set of system components in any other suitable manner.

The tracking system 300 can optionally enable users to define a space using the mobile device and a set of venue beacons (the steps to map the space are discussed in more detail in the section on the method). After the space has been mapped, the tracking module preferably enables the tracking of object beacons within the space. Additionally or alternatively, the tracking system 300 may enable tracking of object beacons relative to venue beacons without a generated map (e.g., the boundaries of the tracking zone are just the boundaries outside of which object beacons can no longer be tracked, as opposed to the walls of a room).

The tracking system 300 can optionally enable the historical tracking of objects tagged with object beacons; that is, their location is tracked over time and stored. Frequency of location calculation, data storage options, and any configuration details pertaining to how object beacon location (or other data) is tracked, stored, and/or analyzed may be set by the tracking module.

The tracking system 300 can be entirely or partially run on: a user device (e.g., through a user client or application on the user device), a remote computing system, or any other suitable processing system. In one variation, the tracking module can include a user client that runs on the user devices, receives the beacon signals, determines the signal information, and determines the beacon data from the signal; and a processing module that runs on the remote computing system and determines the relative locations based on the beacon signals and/or beacon data. However, the tracking module processes can be otherwise split.

In variants where the user client and/or user device 200 runs a portion of the tracking system 300, the user client and/or user device can transmit one or more information sets to the remote computing system. The information set can include: beacon information determined from a received beacon signal, signal information determined for the received beacon signal, a signal receipt timestamp, a mobile device identifier (e.g., user identifier, user account identifier, user client identifier), and/or any other suitable information.

The user client can be a native application, a web application, an operating system application, a software development kit (SDK), an application programming interface (API), or be any other suitable application or executable. The user client can be associated with an entity (e.g., a retail entity). In one example, a retail entity can integrate beacon functionality into their application through an SDK provided by the beacon manufacturer.

Examples of the user device 200 (mobile device) include a tablet, smartphone, mobile phone, laptop, watch, wearable device (e.g., glasses), or any other suitable user device. The user device can include power storage (e.g., a battery), processing systems (e.g., CPU, GPU, memory, etc.), outputs (e.g., display, speaker, vibration mechanism, etc.), inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), or any other suitable component. The communication system can include one or more: omnidirectional antennae, directional antennae, or radios with any suitable configuration. The user device preferably shares a communication protocol with the beacon(s), but can alternatively communicate with the beacons through a wired or wireless connection in any other suitable manner.

The user device 200 is preferably internet-connected to enable cloud-based contextual responses to broadcasted beacon data; additionally or alternatively, contextual responses may be performed based on data stored locally on the mobile device.

The system 1 (e.g., tracking system, beacon database, user device database, etc.) can additionally store user device information. User device information can include: user device identifiers, user identifiers (e.g., account identifiers, client identifiers, etc.), user device locations (e.g., one or more across one or more timestamps), user device sensor data determined by sensors on-board the user device (e.g., one or more sets across one or more timestamps), client information (e.g., associated entity, use statistics, etc.), or other user device information.

The user device locations can be determined by on-board location system, automatically determined from secondary beacon locations and the signal quality values of the signals received by the user device from the secondary beacons, determined from an image, received from a user, or otherwise determined. The user device locations and/or underlying data can be stored in association with the determined beacon location, respective signal quality values, receipt time, beacon data extracted from the signal, or other information for the beacon signal and/or beacon. However, any other suitable user device information can be otherwise determined.

The remote computing system can include a set of networked servers, but can alternatively include a set of networked user devices (e.g., in a distributed computing system), or include any suitable set of computing systems.

4. Object Tracking Method

Figure 4:
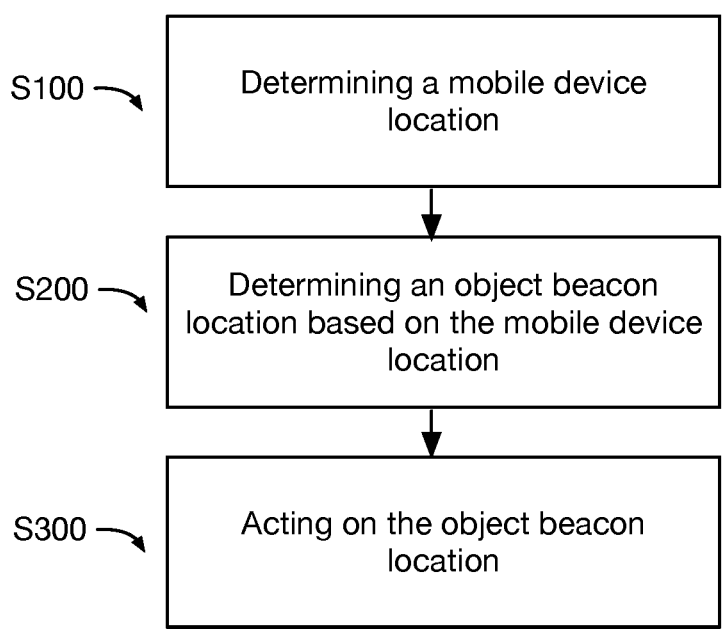
FIG. 4 is a schematic representation of the object tracking method.

As shown in FIG. 4, an object tracking method includes determining the location of a mobile device S100 and determining the location of an object beacon S200. The method can additionally include acting based on the object beacon information S300. The method is preferably performed by the system disclosed above, but may additionally or alternatively be performed by any suitable system.

The method functions to enable the tracking of objects coupled to object beacons by harnessing background communication with object beacons; object beacon location can be tracked (and even recorded over time) simply from movement of the mobile device and standard communications with the beacons. In this manner, the method creates a low-cost, low-resource-intensive method for managing assets, inventory, or simply always being able to find your keys.

A. Determining the Mobile Device Location

Determining the location of a mobile device S100 functions to enable positional tracking of the mobile device in order to facilitate object tracking. The determined mobile device location is preferably representative of a physical location (e.g., specific location, specific region, relative location, etc.), but can alternatively be a virtual location or be any other suitable location. The mobile device location can be determined by the tracking system at the user device, the remote computing system, or at any other suitable computing system. The mobile device location can be estimated, calculated, selected from a chart or graph, determined using a neural network or other computational model (e.g., wherein the mobile device location can be that having the highest probability or a probability above a threshold, etc.), or otherwise determined.

The determined mobile device location (user device location) can be stored in a mobile device database and/or the beacon database. The determined mobile device location can be timestamped with the location determination time, the signal receipt time (e.g., of the signals from which the device location was determined), the signal transmission time, with any other suitable timestamp, or remain unstamped. The mobile device location can be determined: immediately after receipt of a signal indicative of device location (e.g., in real- or near-real time), at a predetermined frequency, upon occurrence of any other suitable trigger event, or at any other suitable time.

Mobile device locations are preferably determined for every mobile device of a set of mobile devices, but can alternatively be determined for a subset of the set. The mobile device set can include mobile devices within a physical space, mobile devices running a user client associated with the beacon and/or physical space, mobile devices that receive beacon signals, or any other suitable set of mobile devices. The mobile devices included within the set can change over time (e.g., as users enter and exit the physical space), remain constant, or be otherwise defined.

In a first variation, the mobile device location is determined S100 by the mobile device, using the location system of the mobile device (e.g., an on-board GPS system). In this variation, the mobile device automatically determines the mobile device location and transmits the mobile device location to the tracking module.

Figure 5:
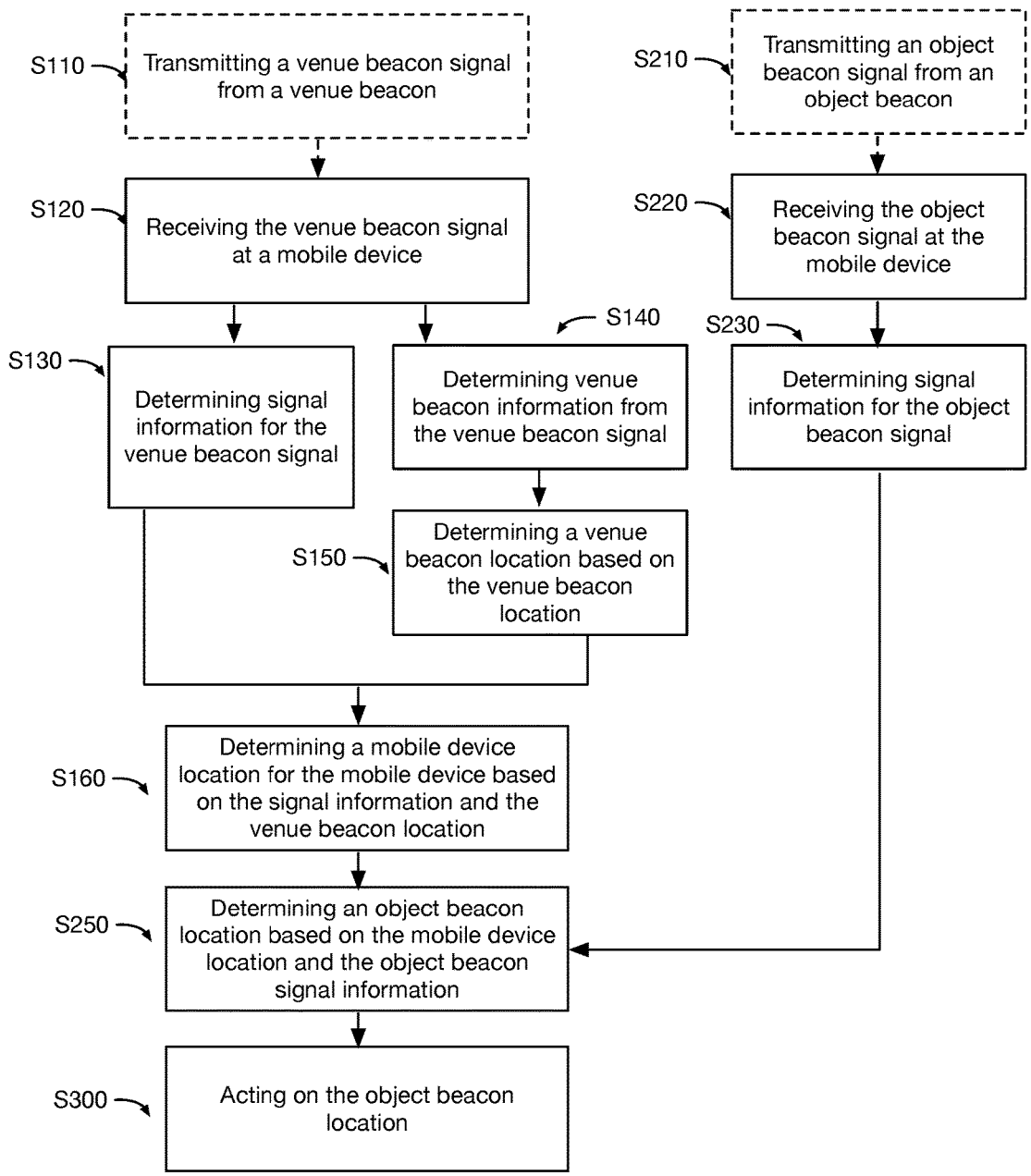
FIG. 5 is a schematic representation of a variant of the object tracking method.
Figure 6:
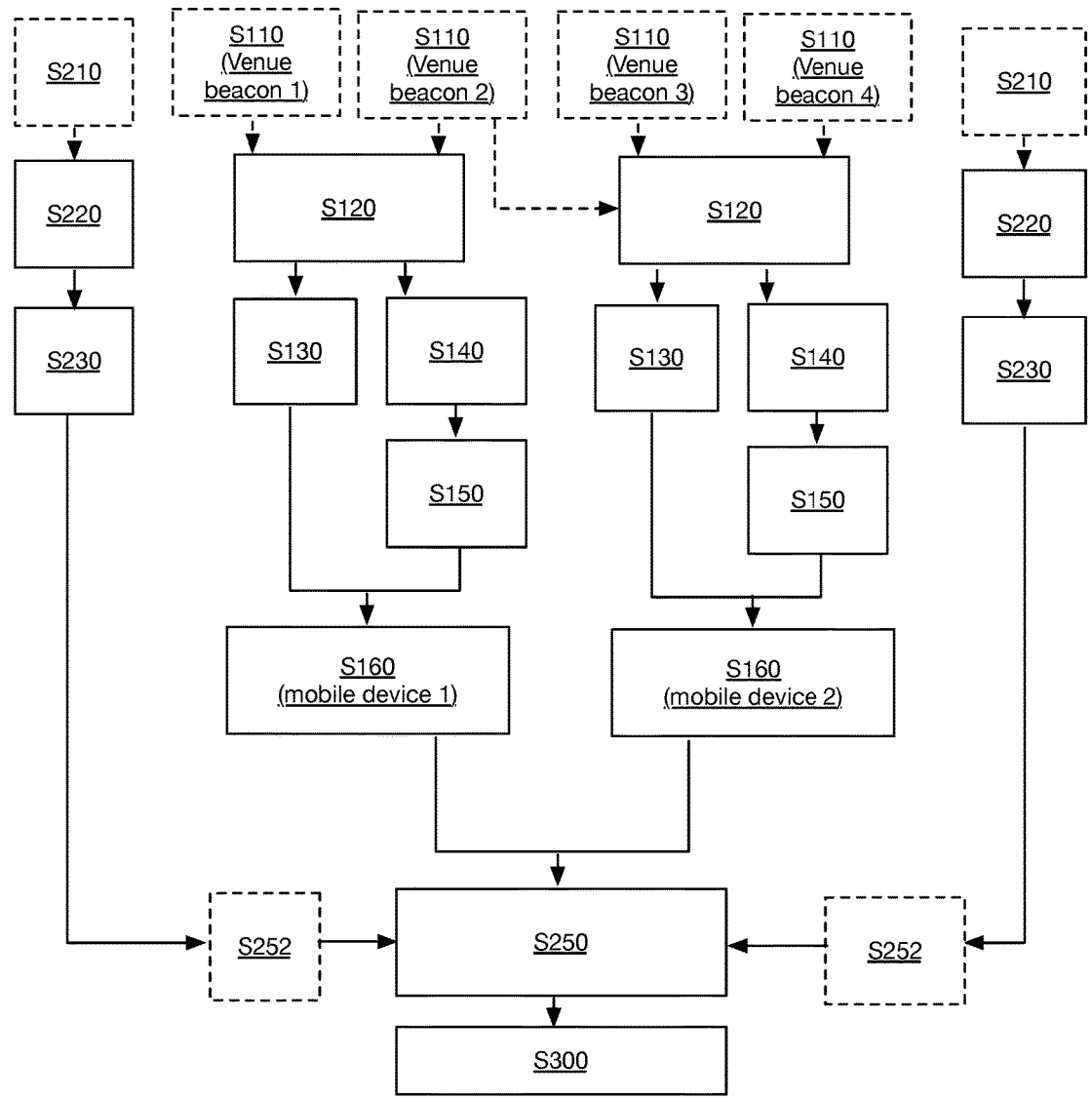
FIG. 6 is a schematic representation of an example of the object tracking method.
Figure 8:
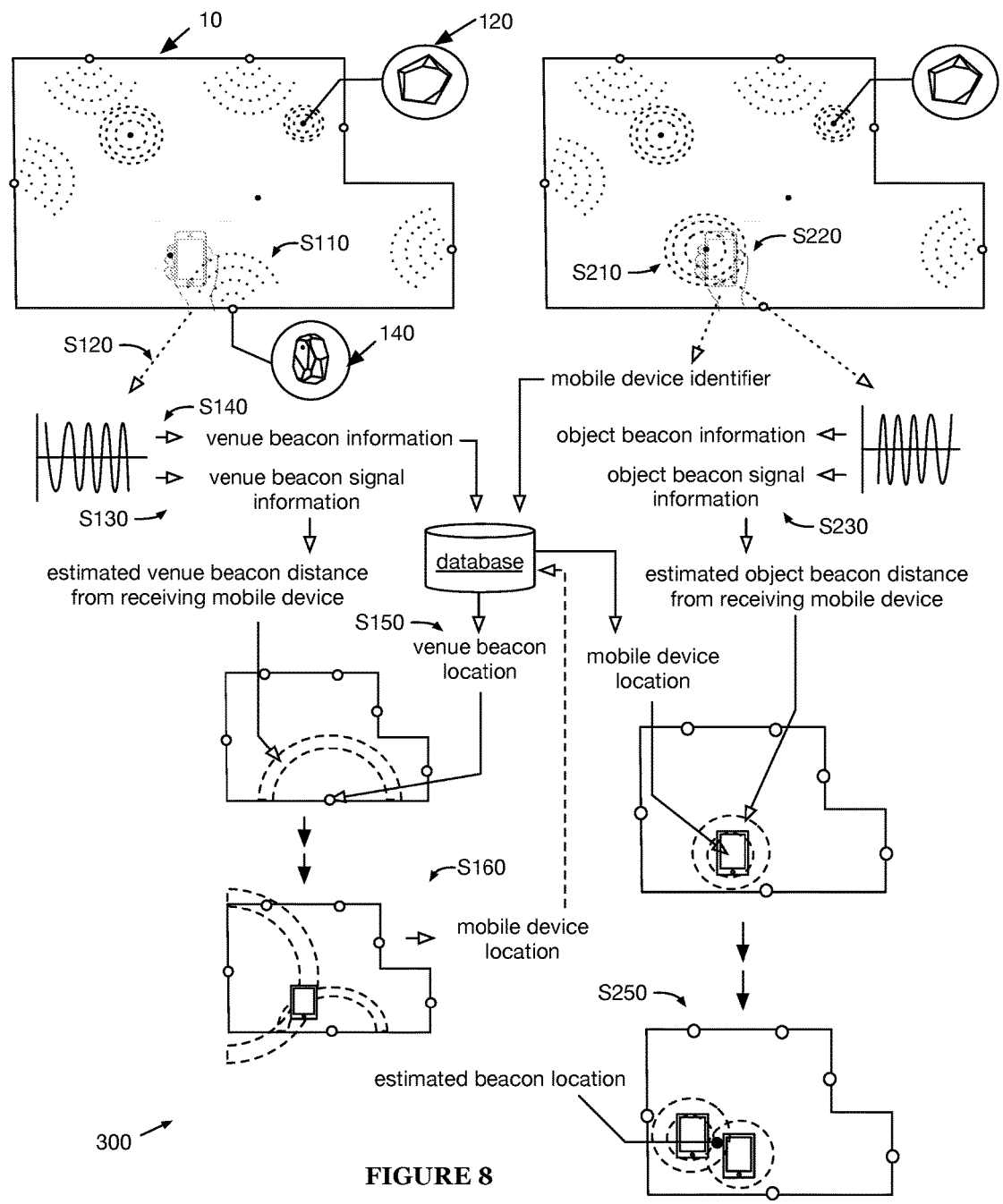
FIG. 8 is a schematic representation of an example of mobile device location determination based on known beacon locations, and object beacon location determination based on the determined mobile device locations.

In a second variation, as shown in FIG. 5, the mobile device location is determined S100 based on one or more beacon locations (examples shown in FIG. 6 and FIG. 8). In one embodiment, the mobile device location is estimated based on mobile device proximity to one or more beacons of known location. If the relative positions of the venue beacons are known, the position of the mobile devices relative to those venue beacons can be calculated using knowledge of the distance of the mobile device from each of the venue beacons. Distance is not necessarily known explicitly, but it can be estimated using a correspondence between RSSI of the beacon (as measured by the mobile device) and distance from that beacon.

In this variation, the method can include: receiving a beacon signal transmitted by a beacon S120, determining signal information (e.g., signal quality values) for the beacon signal S130, and determining beacon information from the beacon signal S140, wherein the mobile device location is determined from the signal information for the beacon signal and a beacon location associated with the beacon information S160. The method can optionally include transmitting at least the signal information and all or part of the beacon information (e.g., the beacon identifier) to the remote computing system (e.g., from the receiving mobile device), wherein the remote computing system determines the mobile device location.

In the second variation, the method can optionally include timestamping the beacon information sent to the remote computing system, such that the mobile device location can be determined for a first time using beacon information determined by the respective mobile device at timestamps proximal (e.g., within a threshold time duration, such as 1 second, 5 seconds, 30 seconds, 1 minute, 10 minutes, 1 hour, etc.) the first time. However, the mobile device location can be determined based on any other suitable set of beacon information.

In the second variation, the method can optionally include repeating this process for each of a plurality of beacons, such that the mobile device location can be determined from a plurality of beacon locations and the respective signal information. The beacon information used to determine a mobile device location for the mobile device can be time-limited (e.g., wherein the signals were received within a threshold time duration of each other), mobile device sensor measurement-limited (e.g., wherein the signals were received after, before, and/or during a characteristic sensor measurement pattern was measured by the sensors), unlimited, or otherwise determined. For example, the beacon information used to determine the mobile device location can be measured after a characteristic sensor measurement was detected in the (e.g., are associated with receipt timestamps after the timestamp associated with the sensor measurements from which the characteristic sensor measurement pattern was determined). The characteristic sensor measurement pattern can be determined from sensor data received from the mobile device (e.g., determined on-board the mobile device; transmitted by the mobile device to the tracking system and/or remote computing system with the information set; transmitted asynchronously; etc.), from secondary mobile devices monitoring the mobile device, or from any other suitable source. The characteristic sensor measurement pattern can be indicative of mobile device movement (e.g., translation within the space), mobile device movement termination, or of any other suitable event. Examples of characteristic sensor measurement patterns include sensor measurements exceeding, matching, or falling below a threshold; sensor measurement patterns over time substantially matching a predetermined pattern; sensor measurements having a probability of event occurrence above a threshold probability (e.g., using neural networks or other machine learning methods); sensor measurement value change over time exceeding, meeting, or falling below a threshold; or sensor measurements satisfying any other suitable condition. In one example, sensor measurements indicative of mobile device movement can be determined when the accelerometer data exceeds a threshold value, the temperature data exceeds a threshold value, the mobile device ambient temperature increases at a rate beyond a threshold rate, the combination of sensor measurements has a probability exceeding a threshold probability of mobile device motion, or any other suitable sensor measurement condition is met. In a second example, sensor measurements indicative of mobile device movement termination can be determined when the accelerometer data falls below a threshold value, the temperature data falls below a threshold value, the mobile device ambient temperature decreases at a rate beyond a threshold rate, the combination of sensor measurements has a probability exceeding a threshold probability of motion termination, or any other suitable sensor measurement condition is met. However, the characteristic sensor measurement pattern can be otherwise determined.

In the second variation, the method can optionally include repeating this process for each mobile device of the mobile device set, wherein mobile device locations for each mobile device of the set can be concurrently or asynchronously determined. The mobile device locations can be determined relative to: the same set of beacons, overlapping sets of beacons, separate beacon sets, or any other suitable set of beacons.

Receiving a beacon signal transmitted by a beacon S120 functions to receive a signal indicative of mobile device location. The beacon signal can be received from a venue beacon (e.g., fixed beacon, high-power beacon, etc.), object beacon, or any other suitable beacon. The beacon can broadcast the signal S110 at a predetermined frequency, according to a schedule, based on its operation parameters, based on ambient environment parameters, or broadcast at any suitable frequency. In one embodiment, receiving the beacon signal includes receiving a beacon signal broadcast by a venue beacon. However, the beacon signal can be otherwise received.

Determining signal information for the beacon signal S130 functions to determine an indicator of mobile device distance from a reference location. The signal information can include signal quality values (e.g., RSSI) or any other suitable information. The signal information is preferably determined by the receiving device (e.g., mobile device, venue beacon, etc.), but can alternatively be determined by any other suitable system. In one embodiment, determining signal information for the beacon signal includes measuring the signal strength (e.g., RSSI) of venue beacons at the mobile device.

Determining beacon information from the beacon signal S140 functions to determine information indicative of the beacon identity, associated context (e.g., objects, locations, etc.), operation information, or other information. The beacon information can be determined from the beacon signal using demodulation, decryption, decoding, or through any other suitable technique. In one variation, determining the beacon information includes: determining a beacon identifier from the beacon signal, wherein the beacon identifier is read from the determined beacon information. However, the beacon identifier can be otherwise determined (e.g., by matching receipt or transmission time with a broadcast schedule, etc.). In a second variation, determining the beacon information includes determining the beacon sensor data from the beacon signal, wherein the beacon sensor data is read from the determined beacon information. However, any other suitable beacon information can be determined from the signal.

Determining the mobile device location from the signal information for the beacon signal and a beacon location associated with the beacon information S160 functions to estimate the physical mobile device location. The beacon location can be determined from the beacon signal, retrieved from a beacon database (e.g., be the beacon location associated with the determined beacon identifier for the broadcasting beacon within the beacon database), or be otherwise determined. In one variation, the method can include: determining the beacon identifier from the received beacon signal (e.g., at the mobile device) and retrieving the beacon location associated with the beacon identifier from a database (e.g., wherein the beacon identifier is transmitted to a remote computing system, wherein the remote computing system retrieves the beacon location). However, the beacon location can be otherwise determined.

In one embodiment, determining the location of a mobile device based on the signal information and the beacon location S160 includes applying a modified trilateration method. Determining the mobile device location through trilateration can include: determining a distance estimate based on the signal information and using the beacon location as the trilateration centroid and using the distance estimate as the trilateration radius.

Determining a distance estimate based on the signal information can include: determining the distance estimate from the difference between the actual signal quality value and a reference signal quality value. The reference signal quality value can be a factory-calibrated, read-only constant that indicates the expected signal quality value at a predetermined distance from the beacon, or can be any other suitable reference quality value. In one example, determining the distance estimate can include: determining the RSSI of the beacon signal (e.g., the signal information), determining the broadcasting power from the beacon signal, determining the measured power (e.g., the reference signal quality value), and calculating the estimated distance from the RSSI, the broadcasting power, and the measured power. The distance estimate can be a specific distance, a range of distances, a distance classification (e.g., immediate, near, far, etc.), or any other suitable estimate. For example, the mobile device can be classified as near the beacon when the RSSI to measured power ratio satisfies a first condition (e.g., exceeds a threshold ratio, falls below a threshold ratio), classified as intermediate from the beacon when RSSI to measured power ratio satisfies a second condition different from the first (e.g., exceeds a second threshold ratio, falls below a second threshold ratio), and is classified as far when the RSSI to measured power ratio satisfies a third condition different from the first and second (e.g., exceeds a third threshold ratio, falls below a third threshold ratio). However, the distance estimate can be otherwise determined.

Determining the mobile device location by using the beacon location as the trilateration centroid and using the distance estimate as the trilateration radius can include determining a location, within the physical region defined by the distance estimate about the beacon location (e.g., the perimeter of the defined circle), as the physical device location. However, the mobile device location can be otherwise determined.

Determining the mobile device location can additionally include iteratively narrowing the set of possible mobile device locations down with each successive distance estimate and beacon location pair for each of a plurality of beacons (e.g., based on the intersecting physical regions of the physical regions defined about the respective beacon location by the respective distance estimate). In one example, determining the mobile device location includes receiving a plurality of beacon signals, each received from a different beacon, determining a beacon identifier from each signal, determining a signal quality value for each signal, and determining the physical mobile device location based on the signal quality values and the physical beacon locations associated with the respective beacon identifier of the plurality. However, successively determined beacon signal information can be otherwise used.

Alternatively or additionally, determining the mobile device location based on the RSSI can include combining the RSSI-based trilateration techniques with other techniques (such as particle filtering and sensor fusion) in order to improve the positional accuracy of the trilateration method.

In particular, determining the mobile device location based on the RSSI can include utilizing accelerometer and/or gyroscope data from the mobile device, venue beacons, and/or the object beacons to calibrate and/or adjust the RSSI to distance correspondence. For example, if the accelerometer registers some acceleration profile over a period of time, the acceleration profile may be integrated to produce a change in position. This change in position can be compared to a change in RSSI (allowing for corrections to RSSI/distance correspondences to be made in real-time). Determining the mobile device location based on the RSSI can additionally or alternatively include using any data in order to improve positioning results. For example, determining the mobile device location based on the RSSI can include applying machine vision software to video captured by the mobile device in order to judge distances (and/or serve as calibration for the trilateration technique).

In a third variation, the mobile device location can be determined from auxiliary data. For example, the mobile device location can be determined from geotagged posts from an associated user account on a social networking system, be determined from images posted by the user account on the social networking system, or be otherwise determined.

However, the mobile device location can be otherwise determined.

B. Determining the Object Beacon Location

Determining a physical object beacon location for an object beacon S200 functions to locate the object beacon and/or object attached to the object beacon. The determined object beacon location is preferably representative of a physical location (e.g., specific location, specific region, relative location, etc.) of the object beacon, but can alternatively be a virtual location or be any other suitable location. The object beacon location can be determined by the tracking system at the user device, the remote computing system, or at any other suitable computing system. The object beacon location can be estimated, calculated, selected from a chart or graph, determined using a neural network or other computational model (e.g., wherein the object beacon location can be that having the highest probability or a probability above a threshold, etc.), or otherwise determined.

The determined object beacon location (low-power beacon location) can be stored in the beacon database or any other suitable database. The determined mobile device location can be timestamped with the location determination time, the signal receipt time (e.g., of the signals from which the object beacon location was determined), the signal transmission time, with any other suitable timestamp, or remain unstamped. The object beacon location can be determined: immediately after receipt of a signal indicative of object beacon location (e.g., in real- or near-real time), at a predetermined frequency, upon occurrence of any other suitable trigger event, or at any other suitable time.

Object beacon locations are preferably determined for every object beacon of a set of object beacons, but can alternatively be determined for a subset of the set. The object beacon set can include object beacons within a physical space, object beacons proximal a set of mobile devices, object beacons associated with a common entity, or any other suitable set of object beacons. The object beacons included within the set can change over time (e.g., as objects are introduced and removed from the physical space), remain constant, or be otherwise defined.

In a first variation, the object beacon location is determined S200 by the object beacon, using an on-board location system (e.g., an on-board trilateration system, GPS system, etc.). In one embodiment, the object beacon determines the object beacon location (e.g., relative or absolute), and transmits the object beacon location through a proximal mobile device or other communication intermediary (e.g., internet gateway) to the tracking system. In a second embodiment, the object beacon can periodically switch into operation as a master device; scan for and receive beacon signals broadcast by secondary beacons (e.g., venue beacons); and trilaterate the object beacon location based on the received beacon signals (e.g., using the signal quality value and known locations of the secondary beacons, as determined from the beacon signal or retrieved using the secondary beacon identifier determined from the beacon signal). In a third embodiment, the venue beacons within the space can periodically switch into operation as a master device; and scan for and receive object beacon signals broadcast by the object beacon, wherein the object beacon location can be trilaterated based on the received object beacon signals (e.g., using the signal quality value and known locations of the venue beacons) by the remote computing system and/or a venue beacon. However, the object beacon can determine its own location in any other suitable manner.

Figure 7:
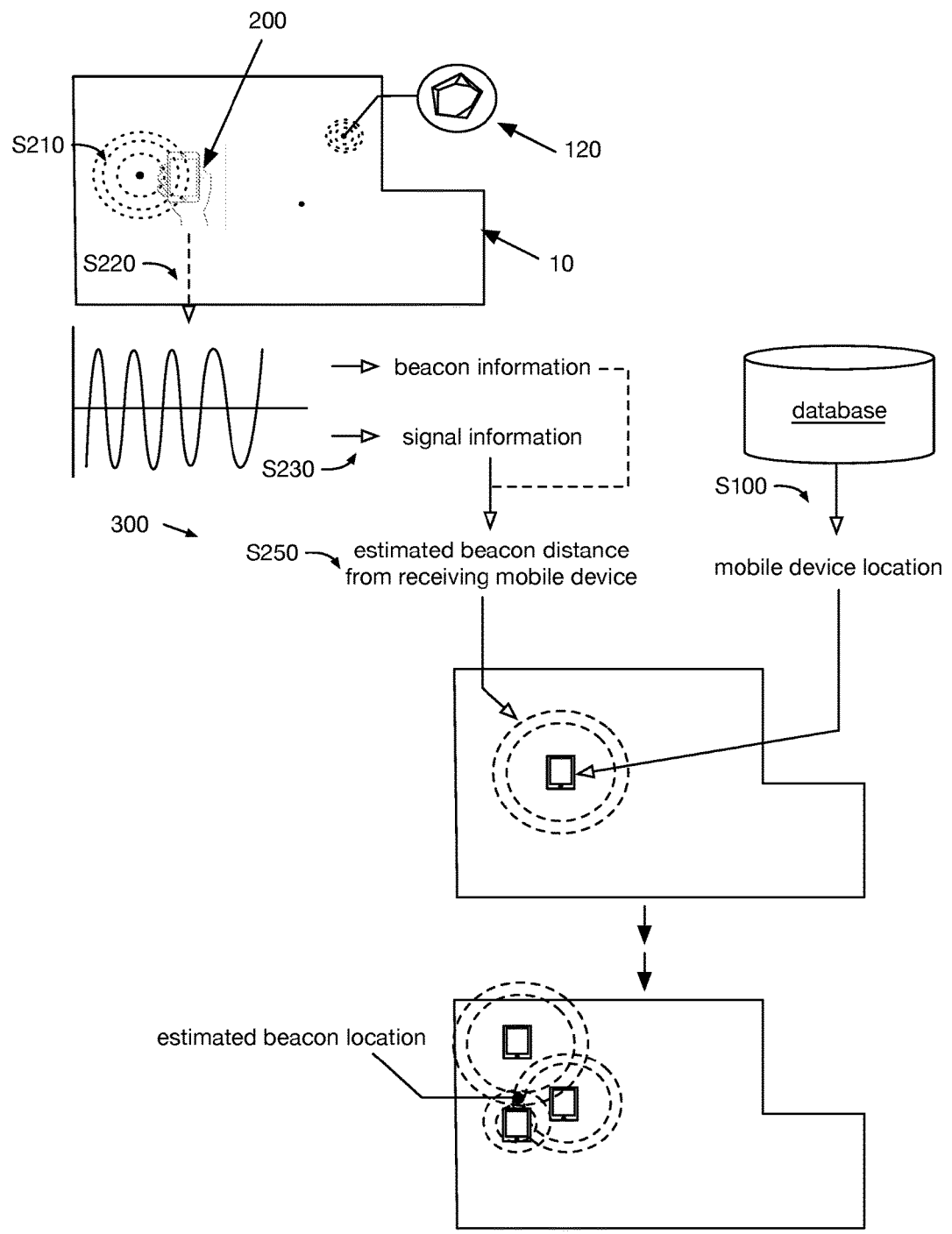
FIG. 7 is a schematic representation of an example of beacon location determination based on mobile device locations.

In a second variation, as shown in FIG. 5, the object beacon location is determined S200 based on one or more mobile device locations (examples shown in FIG. 6, FIG. 7, and FIG. 8). In one embodiment, the object beacon location is estimated based on object beacon proximity to one or more mobile devices of known location. If the relative positions of the venue mobile devices are known, the position of the object beacons relative to those venue mobile devices can be calculated using knowledge of the distance of the object beacon from each of the mobile device locations. In a second embodiment, the object beacon location can be determined in a similar manner to that of the second variant of mobile device location determination. In the second variant of mobile device location determination, one or more venue beacons broadcast a signal that is measured by the mobile device to determine the position of the mobile device. In this variant of object beacon location determination, the object beacon transmits a signal that is measured by one or more mobile devices to determine the position of the object beacon.

In this variation, the method can include: receiving an object beacon signal transmitted by an object beacon S220, determining signal information (e.g., signal quality values) for the object beacon signal S230, and determining object beacon information from the object beacon signal S240, and determining the object beacon location from the signal information for the object beacon signal and a mobile device location associated with the receiving mobile device S250. The method can optionally include transmitting at least the signal information, the mobile device identifier, and/or all or part of the object beacon information to the remote computing system (e.g., from the receiving mobile device), wherein the remote computing system determines the object beacon location.

Receiving an object beacon signal S220 transmitted by a mobile device functions to receive a signal indicative of object beacon location. The object beacon signal can be received from an object beacon (e.g., low-power beacon), wherein the object beacon can broadcast the signal S210 at a predetermined frequency, according to a schedule, based on its operation parameters, based on ambient environment parameters, or broadcast at any suitable frequency. However, the object beacon signal can be otherwise received.

Determining signal information for the object beacon signal S230 functions to determine an indicator of object beacon distance from a reference location. The signal information can include signal quality values (e.g., RSSI) or any other suitable information. The signal information is preferably determined by the receiving device (e.g., object beacon, venue mobile device, etc.), but can alternatively be determined by any other suitable system. In one embodiment, determining signal information for the object beacon signal includes measuring the signal strength (e.g., RSSI) of venue mobile devices at the object beacon.

Determining object beacon information from the object beacon signal S240 functions to determine information indicative of the beacon identity, associated context (e.g., objects, locations, etc.), operation information, or other information. The beacon information can be determined from the beacon signal using demodulation, decryption, decoding, or through any other suitable technique. In one variation, determining the object beacon information includes: determining an object beacon identifier from the object beacon signal, wherein the object beacon identifier is read from the determined object beacon information. However, the object beacon identifier can be otherwise determined (e.g., by matching receipt or transmission time with a broadcast schedule, etc.). In a second variation, determining the object beacon information includes determining the object beacon sensor data from the object beacon signal, wherein the object beacon sensor data is read from the determined object beacon information. However, any other suitable object beacon information can be determined from the object beacon signal.

In one variation, the object beacon signal information can be sent (e.g., transmitted) with an identifier for the receiving mobile device (mobile device identifier) and/or the determined object beacon information to the remote computing system. In a second variation, the object beacon signal information and/or object beacon information can be retained at the mobile device. However, the information can be communicated to any other suitable processing endpoint.

Determining the object beacon location from the signal information for the object beacon signal and a mobile device location associated with the receiving mobile device S250 functions to estimate the physical object beacon location. The mobile device location can be received from the receiving mobile device, retrieved from a database (e.g., based on the mobile device identifier of the receiving mobile device), or be otherwise determined.

In one embodiment, determining the object beacon location based on the signal information and the mobile device location S250 includes applying a modified trilateration method. Determining the object beacon location through trilateration can include: determining a distance estimate based on the signal information and using the mobile device location as the trilateration centroid and using the distance estimate as the trilateration radius.

Determining a distance estimate based on the signal information can include: determining the distance estimate from the difference between the actual signal quality value and a reference signal quality value. The reference signal quality value can be a factory-calibrated, read-only constant that indicates the expected signal quality value at a predetermined distance from the object beacon, or can be any other suitable reference quality value. In one example, determining the distance estimate can include: determining the RSSI of the object beacon signal (e.g., the signal information), determining the broadcasting power from the object beacon signal, determining the measured power (e.g., the reference signal quality value), and calculating the estimated distance from the RSSI, the broadcasting power, and the measured power. The distance estimate can be a specific distance, a range of distances, a distance classification (e.g., immediate, near, far, etc.), or any other suitable estimate. For example, the object beacon can be classified as near the mobile device when the RSSI to measured power ratio satisfies a first condition (e.g., exceeds a threshold ratio, falls below a threshold ratio), classified as intermediate from the mobile device when the RSSI to measured power ratio satisfies a second condition different from the first (e.g., exceeds a second threshold ratio, falls below a second threshold ratio), and is classified as far when the RSSI to measured power ratio satisfies a third condition different from the first and second (e.g., exceeds a third threshold ratio, falls below a third threshold ratio). However, the distance estimate can be otherwise determined.

Determining the object beacon location by using the mobile device location as the trilateration centroid and using the distance estimate as the trilateration radius can include determining a location, within the physical region defined by the distance estimate about the mobile device location (e.g., the perimeter of the defined circle), as the physical device location. Three or more unique readings are preferably used to perform modified trilateration, but any suitable number of readings (information sets) can alternatively be used. However, the object beacon location can be otherwise determined.

Determining the object beacon location can additionally include iteratively narrowing the set of possible object beacon locations down with each successive distance estimate and mobile device location pair for each of a plurality of mobile devices receiving the object beacon signal (e.g., based on the intersecting physical regions of the physical regions defined about the respective mobile device location by the respective distance estimate).

In one example, determining the object beacon location includes receiving the object beacon signal at each of a plurality of mobile devices (e.g., concurrently, asynchronously, within a time window, etc.); determining the object beacon identifier from each signal; determining a signal quality value for each object beacon signal at each mobile device of the plurality; and determining the physical object beacon location based on the signal quality values for the common object beacon identifier and the physical mobile device location of the mobile device from which the respective signal quality value was received.

In a second example, determining the object beacon location includes receiving the object beacon signal at a mobile device at each of a plurality of times, wherein the mobile device is located in a different mobile device location at each time of the plurality; determining a signal quality value for each received object beacon signal; associating the signal quality value with the respective signal receipt or transmission time; and determining the physical object beacon location based on the signal quality values and the respective physical mobile device location concurrent with or temporally proximal the associated signal receipt or transmission time. However, successively determined object beacon signal information can be otherwise used.

Alternatively or additionally, determining the object beacon location based on the RSSI can include combining the RSSI-based trilateration techniques with other techniques (such as particle filtering and sensor fusion) in order to improve the positional accuracy of the trilateration method.

In particular, determining the object beacon location based on the RSSI can include utilizing accelerometer and/or gyroscope data from the object beacon, venue beacons, and/or the receiving mobile devices to calibrate and/or adjust the RSSI to distance correspondence. For example, if the accelerometer registers some acceleration profile over a period of time, the acceleration profile may be integrated to produce a change in position. This change in position can be compared to a change in RSSI (allowing for corrections to RSSI/distance correspondences to be made in real-time). Determining the object beacon location based on the RSSI can additionally or alternatively include using any data in order to improve positioning results. For example, determining the object beacon location based on the RSSI can include applying machine vision software to video captured by the mobile device in order to judge distances (and/or serve as calibration for the trilateration technique).

Determining the object beacon location can additionally include calculating a confidence level for the determined object beacon location. The confidence level can be calculated based on the confidence level, error rate, noise, or other error parameter of: the determined mobile device location, the object beacon distance estimate from the mobile device location, the number of information sets used to determine the object beacon location, or based on any other suitable parameter.

However, the object beacon location can be otherwise determined.

The method can optionally include timestamping the beacon information sent to the remote computing system, such that the object beacon location can be determined for a first time using beacon information determined by the respective mobile device at timestamps proximal the first time (e.g., within a threshold time duration, such as 1 second, 5 seconds, 30 seconds, 1 minute, 10 minutes, 1 hour, etc.). However, the object beacon location can be determined based on any other suitable set of beacon information.

The method can optionally include repeating this process for each of a plurality of mobile devices, such that the object beacon location can be determined from a plurality of mobile device locations and the respective signal information. The plurality of mobile devices can each be running different instances of the same user client (e.g., the same application, provided by the same entity, etc.), be running instances of different user clients (e.g., wherein a first mobile device is running a Target™ application and a second mobile device is running a Walmart™ application), or be running any suitable user client.

The method can optionally include repeating this process for each object beacon of the object beacon set, wherein object beacon locations for each object beacon of the set can be concurrently or asynchronously determined. The object beacon locations can be determined relative to: the same set of mobile devices, overlapping sets of mobile devices, separate mobile device sets, or any other suitable set of mobile devices.

Figure 10:
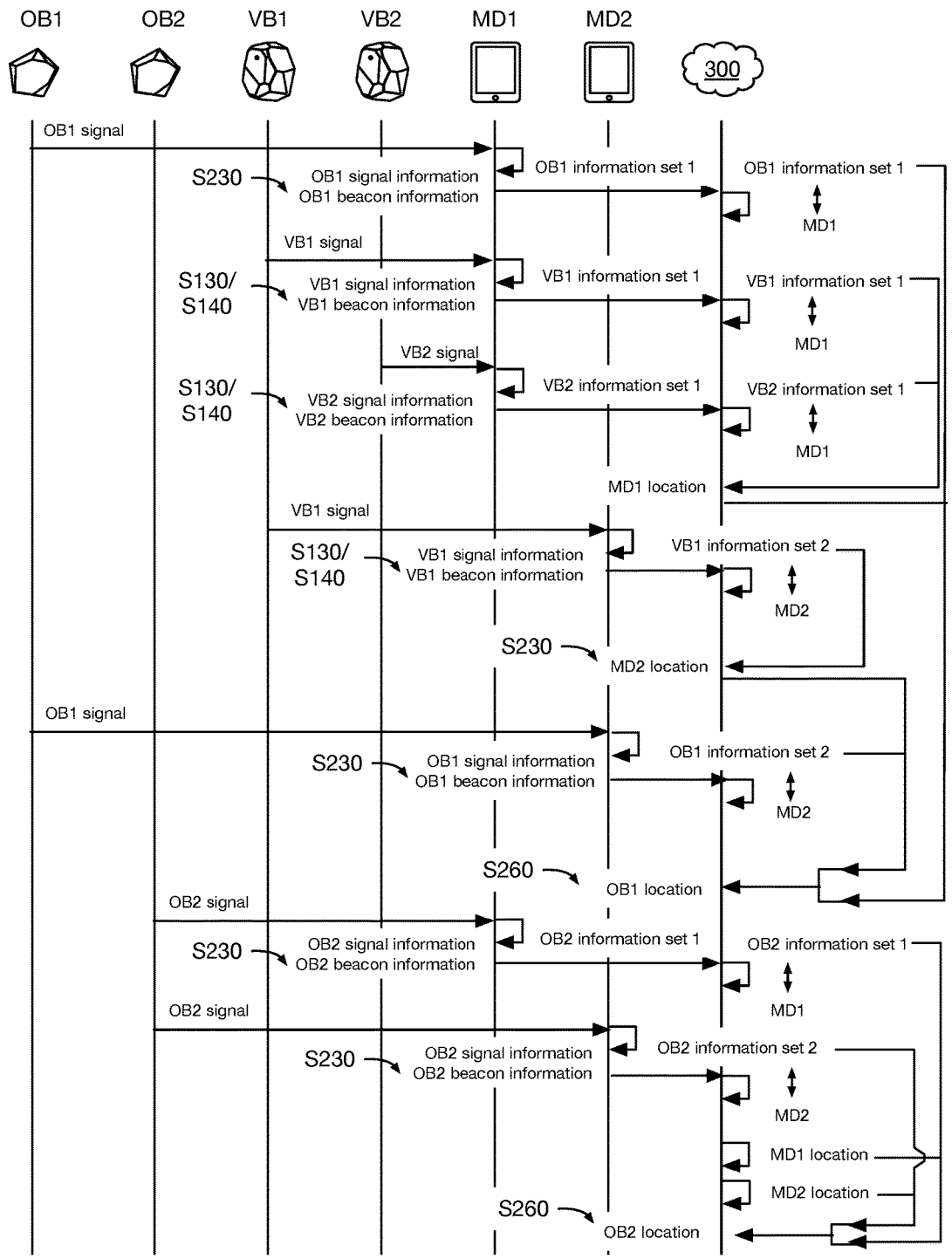
FIG. 10 is a schematic representation of an example of mobile device location determination using venue beacon signals, and object beacon location determination using object beacon signals and the determined mobile device locations.

The method can optionally include receiving a plurality of information sets (e.g., beacon information, signal information, mobile device identifier, etc.) for each of a plurality of object identifiers from each mobile device at the tracking system and determining a subset of the plurality of information sets to use for object beacon location determination S252. The plurality of information sets used for object beacon location determination can be filtered for information sets associated with a single object beacon (e.g., associated with the beacon identifiers for the single beacon), examples shown in FIG. 10, or otherwise reduced. An information set can be considered associated with a given object beacon when the information set includes the respective object beacon identifier, when the object beacon signal receipt timestamp or determined signal transmission timestamp is within a threshold duration of a scheduled object beacon signal transmission time, when the information set is received from a mobile device proximal the last known location of the object beacon, or be otherwise associated with the object beacon.

Multiple information sets (e.g., including signal information, beacon information, receiving mobile device information, and/or timestamps) can be used to determine a location for a single object beacon. The multiple information sets can be from: the same mobile device and recorded at multiple timepoints or physical locations; multiple mobile devices and recorded at the same or different timepoints and/or the same or different physical locations; or any other suitable combination thereof. In one example, if only one mobile device is available, the object beacon position is preferably calculated as the mobile device moves throughout the covered area (essentially simulating the presence of receivers in different locations). In a second example, if many mobile devices are available, the object beacon position may be calculated using proximity data from multiple mobile devices.

Each mobile device can concurrently (or within a predetermined time threshold) receive beacon signals from one or more beacon signals. When each mobile device receives multiple beacon signals, the multiple information sets used to determine the location for an object beacon are preferably associated with and/or include the identifier for the object beacon. However, the information sets can be associated with different beacon identifiers, or be any other suitable information set.

The information sets used to determine the location for the object beacon (the object beacon location) can be associated with signal receipt or transmission times satisfying a set of temporal conditions. However, any other suitable qualification conditions can be used to filter and/or reduce the information sets used to determine the object beacon location. The temporal conditions can be associated with decreased object beacon location certainty (e.g., be indicative of object beacon movement within the space, mobile device movement after mobile device location determination, etc.), but can be any other suitable temporal condition.

The temporal condition can include a reference time, wherein only information sets associated with signal receipt or transmission times after the time cutoff are used to determine the object beacon location. However, the temporal condition can include a requirement that the information sets be associated with signal receipt or transmission times before a timestamp, within a temporal range, within a temporal distance from a timestamp of another information set of the plurality, or include any other suitable temporal condition.

The reference time can be user-determined (e.g., received from a user); automatically determined based on the broadcasting frequency of the object beacon (e.g., 10 times the broadcasting frequency); automatically determined based on historic object beacon movement frequency; automatically determined based on a timestamp of last object beacon movement or movement termination; automatically determined based on determination of mobile device movement above a threshold distance after the timestamp associated with the last determined mobile device location; automatically determined based on proximity to the receipt time of the venue beacon signal used to determine the mobile device location; or otherwise determined. The reference time (e.g., time cutoff) can be determined from the instantaneous time (e.g., 5 seconds from the instantaneous time), be a time range (e.g., between the past 10 s to 5 s), or otherwise defined.

Figure 11:
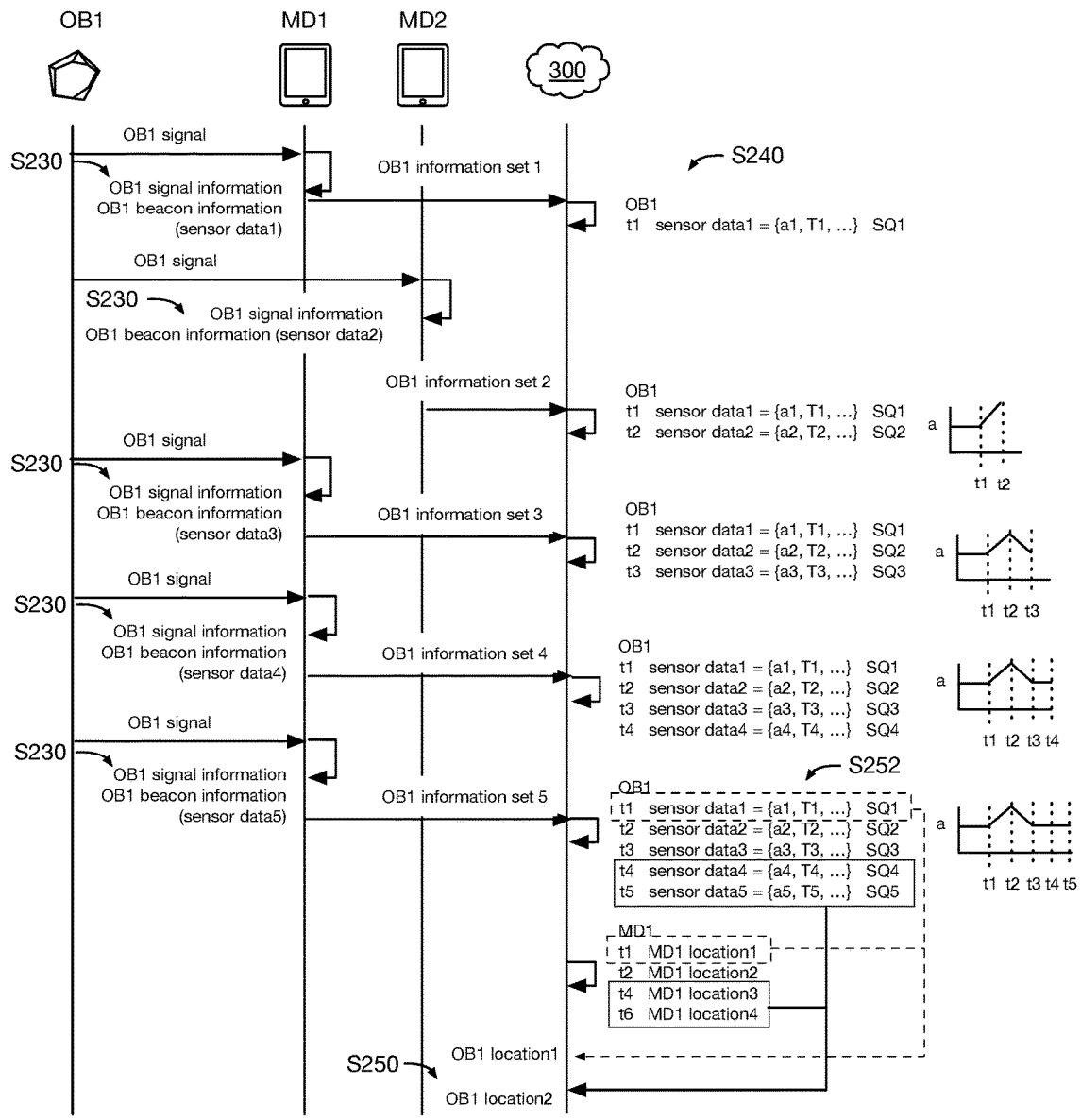
FIG. 11 is a schematic representation of an example of determining a subset of the plurality of information sets to use for object beacon location determination.

In a first embodiment, the information sets used to determine the object beacon location are associated with signal receipt or transmission times that fall after the timestamp of last object beacon movement and/or movement termination (e.g., after the object beacon was determined to be moving or at rest, respectively), example shown in FIG. 11. This can function to temporally delineate information sets used to determine a prior object beacon location from information sets used to determine a new object beacon location, or be used in any other suitable manner.

This embodiment can include determining the timestamp of object beacon movement and/or termination. In one variant of the first embodiment, the object beacon can determine its own movement and/or movement termination based on measurements from on-board sensors and generate a timestamped indicator of beacon movement and/or movement termination (e.g., notification, data, etc.). The timestamped indicator can be transmitted to the tracking system (e.g., via the beacon signal, through the mobile device, etc.), wherein the timestamp of the indicator is used as the reference time (e.g., as the time cutoff for information set inclusion).

In a second variant of the first embodiment, determining the object beacon movement and/or termination timestamp can include determining the object beacon movement and/or termination from sensor data. Determining the object beacon movement and/or termination from sensor data can include: monitoring sensor data for one or more characteristic sensor features, detecting the characteristic sensor feature in sensor data associated with a first timestamp, and setting the first timestamp as the reference timestamp. The sensor data can be recorded and/or received from object beacon, from secondary object beacons monitoring the object beacon, or from any other suitable source. The sensor data is preferably recorded by sensors on-board the source object beacon, but can alternatively be recorded by sensors remote from the object beacon or otherwise determined. The characteristic sensor features can be indicative of object beacon movement (e.g., translation within the space), object beacon movement termination, or of any other suitable event.

The characteristic sensor features can include sensor measurements exceeding, matching, or falling below a threshold; sensor measurement patterns over time substantially matching a predetermined pattern; sensor measurements having a probability of event occurrence above a threshold probability (e.g., using neural networks or other machine learning methods); sensor measurement value change over time exceeding, meeting, or falling below a threshold; or sensor measurements satisfying any other suitable condition. In one example, sensor measurements indicative of object beacon movement can be determined when the accelerometer data exceeds a threshold value, the temperature data exceeds a threshold value, the object beacon ambient temperature increases at a rate beyond a threshold rate, the combination of sensor measurements has a probability exceeding a threshold probability of object beacon motion, or any other suitable sensor measurement condition is met. In a second example, sensor measurements indicative of object beacon movement termination can be determined when the accelerometer data falls below a threshold value, the temperature data falls below a threshold value, the object beacon ambient temperature decreases at a rate beyond a threshold rate, the combination of sensor measurements has a probability exceeding a threshold probability of motion termination, or any other suitable sensor measurement condition is met. However, the characteristic sensor features can be otherwise determined.

In a second embodiment, the information sets used to determine the object beacon location are associated with mobile device locations with high stability confidence values (e.g., high confidence mobile device locations). This can function to account for, or minimize the effect of, mobile device movement between the determined mobile device location and the mobile device location at which the object beacon location was received.

In a first variation of the second embodiment, the information sets used to determine the object beacon location are received from mobile devices having substantially constant mobile device locations between the mobile device location timestamp and the object beacon signal receipt or transmission timestamp. The mobile device location can be considered substantially constant when: the mobile device locations determined for the timeframe deviate below a threshold deviation (e.g., are within 10 m, 5 m, 1 m, etc. of each other), the sensor data received from the mobile device lacks characteristic sensor features indicative of movement, or when any other suitable condition is met.

In a second variation of the second embodiment, the information sets used to determine the object beacon location are associated with signal receipt or transmission times that fall within a predetermined time duration of the receipt time of the venue beacon signal at the shared receiving mobile device. The predetermined time duration can be user-determined, automatically determined based on historic movement parameters of the mobile device, automatically determined based on the mobile device density within the space, automatically determined based on the object beacon density within the space, automatically determined based on the venue beacon density within the space, automatically determined based on the venue beacon and/or object beacon broadcast frequency, or otherwise determined. The object beacon signal can be received before, after, or during receipt of the venue beacon signal(s) at the mobile device, or received at any other suitable time.

However, any other suitable set of information sets can be used to determine the object beacon location.

C. Acting Based on the Object Beacon Information

The method can optionally include acting based on the object beacon information S300, which functions to enable users to interact with the beacon information.

Figure 12:
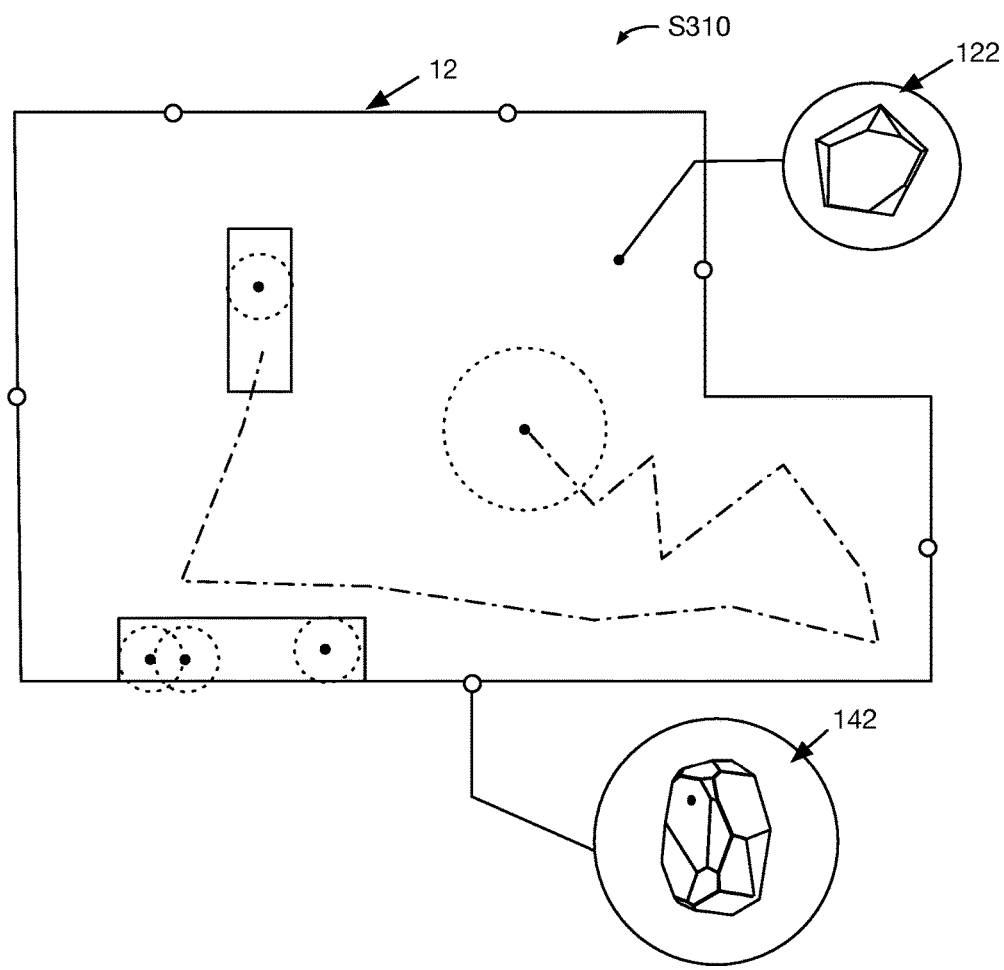
FIG. 12 is a schematic representation of object beacon location visualization within a virtual map, including example graphical representations of positional uncertainty and an example visualization of object beacon movement within the physical space over time.

In a first variation, acting based on the object beacon information includes visualizing the object beacon location within a map S310, which functions to generate a graphical representation of the object beacon locations within the space (example shown in FIG. 12). The map is preferably a virtual map representative of the physical space, but can alternatively be a physical map, a data array correlating physical locations with object beacon locations, or be any other suitable association between the physical space and the object beacon location(s). The virtual map or a graphical representation thereof can be transmitted to a requesting device (e.g., a user device, user station, etc.) in response to receipt of a virtual map request from the requesting device. The virtual map can subsequently be rendered or otherwise displayed by the requesting device. However, the virtual map can be otherwise used.

Visualizing the object beacon location within a map S310 can include: determining a virtual map of the physical space and arranging virtual representations of the object beacons in virtual positions corresponding to the physical object beacon location. However, the object beacon location can be otherwise visualized.

Determining a virtual map of the physical space functions to determine features of the physical space encompassing the object beacon. Determining the virtual map can include: retrieving the virtual map 12 from a repository (e.g., based on the venue beacons used to determine the mobile device locations, the entity associated with the object beacons, venue beacons, tracking system, or user client running on the receiving mobile devices, etc.), automatically generating the virtual map (e.g., based on venue beacon placement and orientation; based on comparisons between actual and expected beacon signal strengths, etc.), or otherwise determining the virtual map.

Arranging virtual representations of the object beacons in virtual positions corresponding to the physical object beacon location functions to locate the object beacon within the virtual map. In one example, this includes arranging a virtual representation of an object beacon in a virtual position corresponding to the physical object beacon location. In a second example, this includes arranging virtual representations of each object beacon in virtual positions representative of the respective physical object beacon locations.

The virtual representation of the object beacon 122 can be a graphic of the beacon, graphic of the object, the object beacon identifier or descriptor, or be any other suitable virtual representation. The virtual representation of the object beacon can include a radius indicative of positional uncertainty (e.g., generated based on the confidence level of the location estimate), or include any other suitable parameter visualization. The virtual map can be a 2-D map, 3-D map, or have any suitable dimensions.

In a first variation, arranging virtual representations of the object beacons within the virtual map includes determining the virtual position within the virtual map corresponding to the absolute physical object beacon location, and arranging the virtual representation of the object beacon at the virtual position. In a second variation, arranging virtual representations of the object beacons within the virtual map includes determining a virtual reference point within the virtual map (e.g., virtual venue beacon location) and arranging the virtual representation of the object beacon relative to the virtual reference point. However, the virtual object beacon can be otherwise arranged within the virtual map.

Visualizing the object beacon location within a map S310 can optionally include arranging virtual representations of the venue beacons 142 in virtual positions corresponding to the physical venue beacon locations within the physical space. The virtual venue beacons can be arranged in a manner similar to virtual object beacon arrangement, but can alternatively be arranged in any other suitable manner within the virtual map.

Visualizing the object beacon location within a map S310 can optionally include arranging virtual representations of the mobile device(s) in virtual positions corresponding to the physical mobile device locations within the physical space. The virtual mobile device(s) can be arranged in a manner similar to virtual object beacon and/or virtual venue beacon arrangement, but can alternatively be arranged in any other suitable manner within the virtual map.

Visualizing the object beacon location within a map S310 can optionally include visualizing object beacon movement within the physical space over time. This can include: retrieving a history of object beacon locations from the beacon database, mapping the object beacon locations within the virtual map, and connecting virtual representations of temporally adjacent object beacon locations. However, object beacon movement within the space can be otherwise visualized. This process can optionally be performed for mobile device movement throughout the physical space.

In a second variation, acting based on the object information S300 includes generating directions to the object beacon. This can include: receiving a direction request from a requesting device, determining a physical location of the requesting device (e.g., within a predetermined time duration of request receipt), determining the physical location of a specified object beacon, and generating directions to the object beacon based on the object beacon location and the requesting device location. However, directions can be otherwise generated.

In a third variation, acting based on the object information S300 includes managing inventory for the physical space. This can include: determining the object beacon locations for a plurality of object beacons within the space, determining the number of object beacons having a given parameter (e.g., attached to a given object type) within the space (e.g., based on whether the object beacon identifier had been received a mobile device running the user client within an inventory time window, such as a day or an hour), and determining whether any objects are missing, require reorganization, or require any other suitable action based on the object beacon information. However, inventory can be otherwise managed for the physical space.

Figure 14:
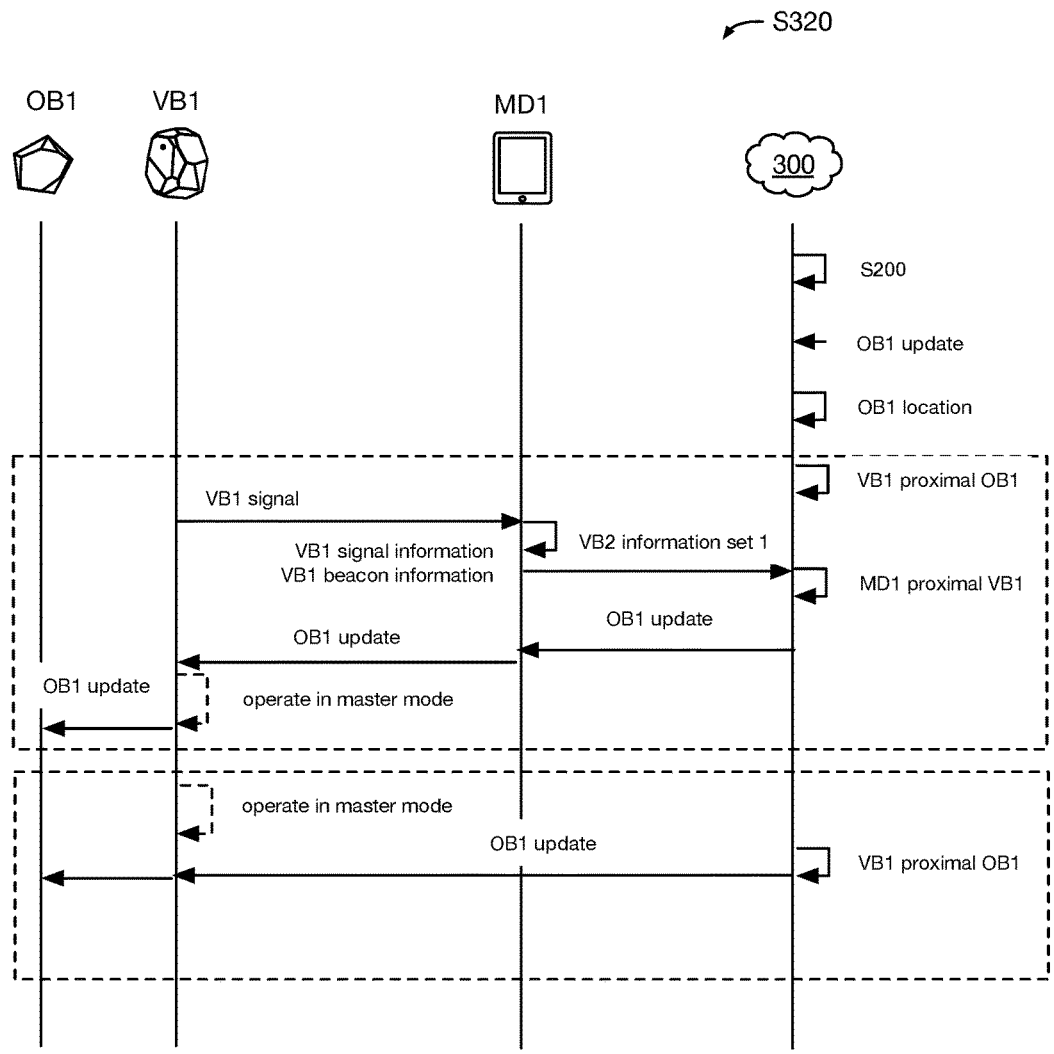
FIG. 14 is a schematic representation of an example of remote object beacon control.

In a fourth variation, acting based on the object information S300 includes remotely controlling object beacon operation S320, examples shown in FIG. 14. Beacon operation can be remotely controlled through the proximal venue beacons, through proximal mobile devices, or through any other suitable gateway. In a first example, this can include: in response to object beacon location determination, identifying the venue beacons proximal (e.g., within communication range) of the object beacon, selectively controlling one or more of the identified venue beacons to operate in master mode, and transmitting control instructions (e.g., updates, operation instructions, etc.) to the object beacon through the venue beacon. In a second example, this can include: in response to object beacon location determination, identifying one or more mobile devices proximal (e.g., within communication range) of the object beacon, and transmitting control instructions (e.g., updates, operation instructions, etc.) to the object beacon through one or more of the identified mobile devices. The mobile device can be that used to determine the object beacon location, or be a different mobile device.

In a first embodiment, controlling object beacon operation includes updating the object beacon. In a second embodiment, controlling object beacon operation includes remotely controlling the object beacon (e.g., emit a sound, emit light, vibrate, etc.). In a third embodiment, controlling object beacon operation includes remotely controlling the object that the object beacon is connected to. In a first example of this embodiment, the object beacon can receive and forward the control instructions to the object (e.g., through NFC, a wired connection, etc.). In a second example, the object can be directly controlled by proximal mobile devices and/or venue beacons. However, the object can be otherwise controlled.

In a fifth variation, acting based on the object information includes returning object information associated with the object beacon, wherein the object information is preferably displayed on the mobile device (e.g., by the user client). Returning object information associated with the object beacon can include: receiving the object beacon identifier at the tracking system from a mobile device, determining the object information associated with the object beacon identifier (e.g., a URL, text, images, video, etc.), and returning the object information to the mobile device. The mobile device can be that used to determine the object beacon location, or be a different mobile device. Returning object information can optionally include: determining the client entity associated with the user client running on the mobile device during object beacon signal receipt (e.g., from the information set), determining a beacon entity associated with the beacon (e.g., from the beacon database), and returning the object information in response to the client entity matching the beacon entity. Returning object information can optionally include returning object information in a manner similar to that disclosed in U.S. application Ser. No. 14/463,597 filed 19 Aug. 2014 and/or Ser. No. 14/956,209 filed 1 Dec. 2015, incorporated herein in their entireties by this reference. However, the object information can be otherwise determined and returned.

Figure 13:
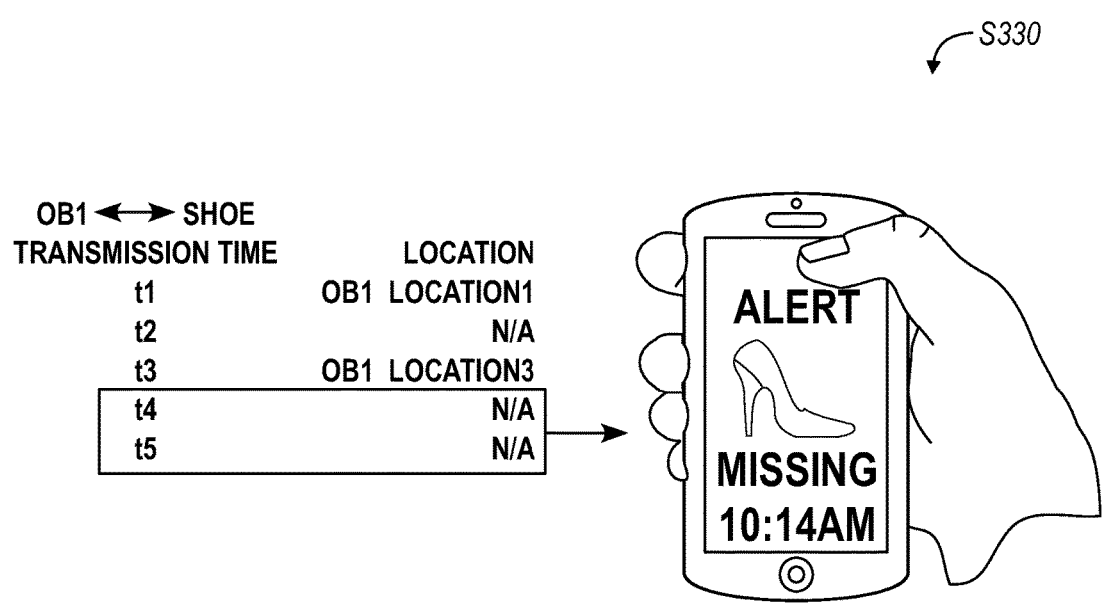
FIG. 13 is a schematic representation of an example of notification generation and presentation.

In a sixth variation, acting based on the object information includes generating a notification and sending the notification to a specified entity (e.g., management entity) S330, example shown in FIG. 13. The notification can be generated and/or sent when the object beacon is moved, when the object beacon is not detected by mobile devices within the space for a predetermined period of time (e.g., 1 day, 1 week, etc.), or be generated in response to the occurrence of any other suitable event. The notification can include: a description of why the object beacon is not being detected (e.g., high probability explanation for the missing object beacon, determined using neural networks or other algorithms based on historic object beacon sensor data and/or locations, etc.), the last determined object beacon location, a descriptor of the object beacon, a descriptor of the associated object, or include any other suitable information. Notification parameters, such as urgency, sending frequency, overriding capabilities, or other parameters, can be adjusted based on the associated object value, the rarity of event occurrence, or based on any other suitable parameter. For example, the notification with overriding capabilities can be immediately generated and transmitted to the user device when the object value exceeds a threshold value. In one variation, the notification can be transmitted over a wireless communication channel (e.g., the internet) to a managing user device, automatically activates an application on the managing user device, causes an alert for time-sensitive information to display on the application, and enables connection of the remote managing user device to the tracking system or auxiliary system (e.g., police system) over the internet to assist in object tracking and location. In a specific example, the tracking system can additionally alert the managing user device when the object beacon is subsequently detected in a second physical space (e.g., associated or unassociated with the managing user device) through the system, wherein the alert can include an identifier for the second physical space, contact information, or any other suitable information.

D. Specific Examples

In one example, the method for beacon location determination can include: receiving a venue beacon signal transmitted by a venue beacon; determining a first signal quality value for the venue beacon signal and a venue beacon identifier from the venue beacon signal; determining a first physical user device location based on the first signal quality value and a physical venue beacon location associated with the venue beacon identifier; at the user client, receiving an object beacon signal, transmitted by an object beacon, within a predetermined time duration from receipt of the first beacon signal; determining a second signal quality value for the object beacon signal and an object beacon identifier from the second beacon signal; determining a physical object beacon location based on the first physical user device location and the second signal quality value; and storing the physical object beacon location in association with the object beacon identifier. This can be repeated and/or performed across a plurality of user devices, object beacons, and/or venue beacons.

The method can further include transmitting the first signal quality value, the venue beacon identifier, the second signal quality value, and the object beacon identifier from the user device to a remote computing system, wherein the first physical user device location and the physical object beacon location are determined at the remote computing system, wherein the physical object beacon location is stored at the remote computing system.

The object beacon identifier can include a broadcast identifier, wherein the method further includes: resolving the object beacon identifier into a unique beacon identifier based on a rule, wherein the object beacon identifier is generated locally on the object beacon based on the rule; determining information associated with the unique beacon identifier; and presenting the determined information on the user client. The method can additionally include identifying a first entity associated with the unique beacon identifier; and determining a second entity associated with the user client, wherein the determined information is presented on the user client in response to the first entity matching the second entity.

The method can additionally include automatically generating a virtual map of a physical space associated with the venue beacon identifier, the virtual map including a virtual representation of the venue beacon arranged in a first virtual position within the virtual map corresponding to the physical venue beacon location and a virtual representation of the object beacon arranged in a second virtual position within the virtual map corresponding to the physical object beacon location. The method can further include receiving a virtual map request from a second user client; and transmitting a representation of the virtual map to the second user client in response to virtual map request receipt.

The method can additionally include receiving a plurality of beacon identifiers, each beacon identifier determined from a different beacon signal, each beacon identifier associated with a signal quality value for the respective beacon signal, wherein determining the first physical user device location can additionally include: determining the first physical user device location based on the first signal quality value, the physical venue beacon location, a physical location associated with each beacon identifier of the plurality, and the respective signal quality value associated with each beacon identifier of the plurality.

The method can additionally include: receiving a plurality of signal quality values for signals from which the object beacon identifier was extracted; wherein determining the physical object beacon location can include: determining a physical user device location associated with each user device from which a signal quality value of the plurality was received; and determining the first physical object beacon location based on the first physical user device location, the second signal quality value, the plurality of signal quality values, and the physical user device locations associated with each user device from which a signal quality value of the plurality was received. The plurality of signal quality values can be received from the user client or otherwise received. Each signal quality value of the plurality can be received from a different user device of a plurality of user devices, or be received from the same user device.

The plurality of signal quality values used to determine the beacon location can include signal quality values for signals received by the plurality of user clients after a reference time. The reference time can be a movement termination timestamp, wherein the method can additionally include determining a movement termination timestamp representative of object beacon movement termination. Determining a movement termination timestamp representative of object beacon movement termination can include receiving sensor data from the object beacon at a first time; and setting the first time as the movement termination timestamp in response to parameter values of the sensor data indicating object beacon movement termination. The sensor data can include an accelerometer measurement from an accelerometer on-board the object beacon, wherein the parameter values of the sensor data indicate object beacon movement termination when the accelerometer measurement falls below a threshold value; or include any other suitable sensor data. However, the method can be otherwise performed.

The methods of the preferred embodiment and variations thereof can be embodied and/or implemented at least in part as a machine configured to receive a computer-readable medium storing computer-readable instructions. The instructions are preferably executed by computer-executable components preferably integrated with a beacon locating system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for object beacon location determination using a remote computing system, comprising:

at each of a plurality of user devices, each user device of the plurality in communication with a different venue beacon of a plurality of venue beacons, each venue beacon fixed to a surface of a venue encompassing the venue beacons:
  receiving a venue beacon signal from the respective venue beacon;
  determining a venue beacon signal quality value for the respective venue beacon signal;
  determining a venue beacon identifier from the respective venue beacon signal;
  transmitting the venue beacon signal quality value and the venue beacon identifier to the remote computing system;

at the remote computing system, for each user device of the plurality, determining a physical user device location for the user device based on the respective venue beacon signal quality value and a physical venue beacon location associated with the respective venue beacon identifier;

at each user device of the plurality:
  receiving an object beacon signal from an object beacon of a set of object beacons, each object beacon fixed to a physical object, the object beacon signal received within a predetermined time period from receipt of the venue beacon signal;
  determining a object beacon signal quality value for the respective object beacon signal;
  determining an object beacon identifier for the object beacon from the object beacon signal;
  transmitting the object beacon signal quality value, associated with the object beacon identifier, to the remote computing system;

at the remote computing system, for each object beacon of the set, determining a physical object beacon location for the object beacon based on the object beacon signal quality values associated with the respective object beacon identifier and the physical user device locations of user devices that received the object beacon signal from the object beacon, wherein the physical user device locations of user devices that received the object beacon signal are determined based on the venue beacon signals received by the respective physical user device; and at a user device that received an object beacon signal from an object beacon of the set, displaying information associated with the object beacon.

2. The method of claim 1, wherein a first object beacon of the set is identified by a first object beacon identifier, wherein determining the physical object beacon location for the first object beacon comprises, at the remote computing system:
  identifying user devices of the plurality from which the first object beacon identifier was received;
  retrieving the physical user device locations for each of the identified user devices;
  for each user device of the identified user devices, determining a distance estimate between the first object beacon and the user device, based on the respective object beacon signal quality value associated with the first object beacon identifier received from the user device; and
  determining the physical object beacon location for the first object beacon through trilateration, wherein the physical user device locations are used as centroids and the respective distance estimates are used as radii.

3. The method of claim 2, wherein the object beacon signals from the first object beacon are received by each of the identified user devices at different times.

4. The method of claim 3, wherein the identified user devices comprise user devices that received the object beacon signals from the first object beacon after a reference timestamp.

5. The method of claim 4, further comprising:
  at each user device of the plurality, in response to receipt of the object beacon signal from the object beacon of the set, determining a set of sensor data for the respective object beacon from the object beacon signal, wherein transmitting the object beacon signal quality value and the object beacon identifier to the remote computing system further comprises transmitting the set of sensor data in association with the object beacon identifier; and
  determining the reference time at the remote computing system, comprising:
    generating a time series of sensor data for the first object beacon based on the set of sensor data associated with the first object beacon identifier, the set of sensor data received from the plurality of user devices;
    identifying sensor data parameters associated with beacon movement termination from the time series of sensor data for the first object beacon;
    in response to identifying the sensor data parameters associated with beacon movement termination, determining a termination time associated with the sensor data parameters associated with beacon movement termination; and
    setting the termination time as the reference time.

6. The method of claim 1, further comprising:
  automatically generating a virtual map of a physical space encompassing the plurality of venue beacons, the virtual map comprising:
    virtual representations of each venue beacon of the plurality arranged in virtual positions representative of the respective physical venue beacon locations; and
    virtual representations of each object beacon of the set arranged in virtual positions representative of the respective physical object beacon locations;
  receiving a virtual map request from a management device; and
  transmitting a graphical representation of the virtual map to the management device in response to receipt of the virtual map request.

7. A method for beacon location determination, comprising:
  at a user client executing on a user device, receiving a venue beacon signal transmitted by a venue beacon;
  determining a first signal quality value for the venue beacon signal and a venue beacon identifier from the venue beacon signal;
  determining a first physical user device location based on the first signal quality value and a physical venue beacon location associated with the venue beacon identifier;
  at the user client, receiving an object beacon signal, transmitted by an object beacon, within a predetermined time duration from receipt of the first beacon signal;
  determining a second signal quality value for the object beacon signal and an object beacon identifier from the object beacon signal;
  determining a physical object beacon location based on the second signal quality value and the first physical user device location, the first physical user device location determined based on the venue beacon signal;
  storing the physical object beacon location in association with the object beacon identifier; and
  at the user client, displaying information associated with the object beacon.

8. The method of claim 7, further comprising transmitting the first signal quality value, the venue beacon identifier, the second signal quality value, and the object beacon identifier from the user device to a remote computing system, wherein the first physical user device location and the physical object beacon location are determined at the remote computing system, wherein the physical object beacon location is stored at the remote computing system.

9. The method of claim 7, wherein the object beacon identifier comprises a broadcast identifier, the method further comprising:
  resolving the object beacon identifier into a unique beacon identifier based on a rule, wherein the object beacon identifier is generated locally on the object beacon based on the rule;
  determining information associated with the unique beacon identifier; and
  presenting the determined information on the user client.

10. The method of claim 9, further comprising:
  identifying a first entity associated with the unique beacon identifier; and
  determining a second entity associated with the user client;
  wherein the determined information is presented on the user client in response to the first entity matching the second entity.

11. The method of claim 7, further comprising: automatically generating a virtual map of a physical space associated with the venue beacon identifier, the virtual map comprising a virtual representation of the venue beacon arranged in a first virtual position within the virtual map corresponding to the physical venue beacon location and a virtual representation of the object beacon arranged in a second virtual position within the virtual map corresponding to the physical object beacon location.

12. The method of claim 11, further comprising:
receiving a virtual map request from a second user client;
transmitting a representation of the virtual map to the second user client in response to virtual map request receipt.

13. The method of claim 7, further comprising:
receiving a plurality of beacon identifiers, each beacon identifier determined from a different beacon signal, each beacon identifier associated with a signal quality value for the respective beacon signal;
wherein determining the first physical user device location comprises:
determining the first physical user device location based on the first signal quality value, the physical venue beacon location, a physical location associated with each beacon identifier of the plurality, and the respective signal quality value associated with each beacon identifier of the plurality.

14. The method of claim 7, further comprising:
receiving a plurality of signal quality values for signals from which the object beacon identifier was extracted;
wherein determining the physical object beacon location comprises:
determining a physical user device location associated with each user device from which a signal quality value of the plurality was received; and
determining the first physical object beacon location based on the first physical user device location, the second signal quality value, the plurality of signal quality values, and the physical user device locations associated with each user device from which a signal quality value of the plurality was received.

15. The method of claim 14, wherein the plurality of signal quality values are received from the user client.

16. The method of claim 14, wherein each signal quality value of the plurality is received from a different user device of a plurality of user devices.

17. The method of claim 16, wherein the plurality of signal quality values comprise signal quality values for signals received by the plurality of user clients after a reference time.

18. The method of claim 17, further comprising determining a movement termination timestamp representative of object beacon movement termination, wherein the reference time is the movement termination timestamp.

19. The method of claim 18, wherein determining the movement termination timestamp comprises:
receiving sensor data from the object beacon at a first time; and
setting the first time as the movement termination timestamp in response to parameter values of the sensor data indicating object beacon movement termination.

20. The method of claim 19, wherein the sensor data comprises an accelerometer measurement from an accelerometer on-board the object beacon, wherein the parameter values of the sensor data indicate object beacon movement termination when the accelerometer measurement falls below a threshold value.

* * * * *